US012111032B2

(12) United States Patent
Ko et al.

(10) Patent No.: US 12,111,032 B2
(45) Date of Patent: Oct. 8, 2024

(54) LAMP FOR VEHICLE

(71) Applicant: SL Corporation, Daegu (KR)

(72) Inventors: Dongjin Ko, Gyeongsan-si (KR); Changwoo Baek, Gyeongsan-si (KR); Jin-Sup Shin, Gyeongsan-si (KR); Jong Ryoul Park, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/080,131

(22) Filed: Dec. 13, 2022

(65) Prior Publication Data

US 2023/0204178 A1 Jun. 29, 2023

(30) Foreign Application Priority Data

Dec. 29, 2021 (KR) ........................ 10-2021-0191379

(51) Int. Cl.

| | |
|---|---|
| ***F21S 41/36*** | (2018.01) |
| ***F21S 41/147*** | (2018.01) |
| ***F21S 41/148*** | (2018.01) |
| ***F21S 41/265*** | (2018.01) |
| ***F21S 41/29*** | (2018.01) |
| ***F21S 41/67*** | (2018.01) |

(Continued)

(52) U.S. Cl.

CPC ............. *F21S 41/36* (2018.01); *F21S 41/265* (2018.01); *F21S 41/29* (2018.01); *F21S 41/675* (2018.01); *F21S 41/147* (2018.01); *F21S 41/148* (2018.01); *F21S 41/67* (2018.01); *F21V 5/007* (2013.01); *F21V 5/008* (2013.01)

(58) Field of Classification Search

CPC ........ F21S 41/147; F21S 41/148; F21S 41/29; F21S 41/36; F21S 41/67; F21V 5/007; F21V 5/008

See application file for complete search history.

(56) References Cited

U.S. PATENT DOCUMENTS

| | | | | |
|---|---|---|---|---|
| 2017/0106793 | A1* | 4/2017 | Kumar | B60R 1/00 |
| 2017/0219186 | A1* | 8/2017 | Enno | F21V 7/0091 |
| 2017/0284621 | A1* | 10/2017 | Na | F21S 41/675 |

(Continued)

FOREIGN PATENT DOCUMENTS

| | | | | |
|---|---|---|---|---|
| DE | 102009009472 | A1 * | 8/2010 | B60Q 1/085 |

OTHER PUBLICATIONS

Machine translation of DE 102009009472 A1 retrieved from the FIT database of PE2E search. (Year: 2024).*

*Primary Examiner* — Colin J Cattanach

(74) *Attorney, Agent, or Firm* — United One Law Group LLC; Kongsik Kim; Jhongwoo Peck

(57) ABSTRACT

A lamp for a vehicle using micromirrors includes a variable beam forming part that irradiates light and forms variable beam patterns. In particular, the variable beam forming part includes a first optical part that irradiates the light; a reflection part including a plurality of micromirrors and configured to reflect the light of the first optical part; a second optical part that transmits the light reflected by the reflection part; and a housing that supports the first optical part, the second optical part, and the reflection part. The plurality of micromirrors are configured to adjust their postures between a first posture in which the light incident from the first optical part is reflected in a first direction and a second posture in which the light incident from the first optical part is reflected in a second direction.

6 Claims, 38 Drawing Sheets

(51) Int. Cl.
*F21S 41/675* (2018.01)
*F21V 5/00* (2018.01)

(56) References Cited

U.S. PATENT DOCUMENTS

| | | | | |
|---|---|---|---|---|
| 2018/0172235 A1* | 6/2018 | Ahn | ...................... | F21S 41/176 |
| 2018/0313510 A1* | 11/2018 | Albou | ................... | F21S 41/285 |
| 2018/0356062 A1* | 12/2018 | Mayer | ................... | F21S 41/265 |
| 2019/0316751 A1* | 10/2019 | Mayer | ..................... | F21S 45/43 |
| 2022/0333753 A1* | 10/2022 | Mudry | .................... | F21S 43/14 |

* cited by examiner

LAMP FOR VEHICLE

CROSS-REFERENCE TO RELATED APPLICATION

This application claims priority from Korean Patent Application No. 10-2021-0191379 filed on Dec. 29, 2021, which is incorporated herein by reference in its entirety.

BACKGROUND

1. Technical Field

The present disclosure relates to a lamp for a vehicle, and more particularly, to a lamp for a vehicle capable of forming variable beam patterns using micromirrors.

2. Description of the Related Art

In general, a vehicle is equipped with one or more lamps that provide illumination function for easily identifying objects around the vehicle during low-light conditions (e.g., night-time driving) and signaling function for informing other vehicles or road users of its driving condition.

For instance, the vehicle may be equipped with a vehicle lamp that operates by direct luminescence using lamps, such as a headlamp that irradiates light toward the front to secure a driver's field of view, a brake light that is turned on when the brake is applied, and a direction indicator that is used when the vehicle is turned to right or left. In addition, the front and rear of the vehicle may include reflectors that reflect light so that the vehicle can be easily recognized from outside.

Among them, the headlamp has an essential function to secure the driver's field of view by irradiating light in substantially the same direction as the driving direction of the vehicle when the vehicle is operated in low ambient brightness (e.g., at night or in a tunnel).

On the other hand, as the driver is looking ahead, it is not easy to provide specific information to the driver through the dash board. Therefore, there is a need for a means that provides information at night to a driver who is looking ahead.

SUMMARY

The problem to be solved by the present disclosure is to provide a lamp for a vehicle capable of forming variable beam patterns using micromirrors.

The problems of the present disclosure are not limited to the problems mentioned above, and other objects not mentioned will be clearly understood by those skilled in the art from the following descriptions.

In order to achieve the above object, a lamp for a vehicle according to an embodiment of the present disclosure may include a variable beam forming part configured to irradiate light and form variable beam patterns. In particular, the variable beam forming part may include a first optical part configured to irradiate the light; a reflection part including a plurality of micromirrors and configured to reflect the light from the first optical part; a second optical part configured to transmit the light reflected by the reflection part; and a housing configured to support the first optical part, the second optical part, and the reflection part. Postures of the plurality of micromirrors of the reflection part may be adjusted to a first posture in which the light incident from the first optical part is reflected in a first direction or to a second posture in which the light incident from the first optical part is reflected in a second direction. The second optical part may be disposed on a path of light reflected in the second direction by the plurality of micromirrors, and the first optical part may include a first optical group configured to irradiate light for forming a first variable beam pattern and a second optical group configured to irradiate light for forming a second variable beam pattern different from the first variable beam pattern. Further, the second optical part may include a plurality of lenses configured to transmit the light reflected from the reflection part.

The first optical group may include a first light source configured to irradiate a first light; and a first lens set including a plurality of lenses spaced apart from one another and configured to transmit the first light. The second optical group may include a second light source configured to irradiate a second light; and a second lens set including a plurality of lenses spaced apart from one another and configured to transmit the second light.

The first light source may be disposed so that an optical axis of the first light source coincides with an optical axis of the first lens set, and the second light source may be disposed so that an optical axis of the second light source is spaced apart from an optical axis of the second lens set.

Each of the first optical group and the second optical group may include a first lens and a second lens, and an optical path length between the first lens and the second lens of the first optical group may be formed longer than an optical path length between the first lens and the second lens of the second optical group.

The lamp for a vehicle may further include a support bracket, which includes a first support configured to support the first lens of the first optical group and the first lens of the second optical group; and a second support configured to support the second lens of the first optical group and the second lens of the second optical group.

Further, the second support may include a first support portion configured to support the second lens of the first optical group; and a second support portion configured to support the second lens of the second optical group. A step may be formed between the first support portion and the second support portion so that the first support portion protrudes farther than the second support portion, and accordingly, a distance between a surface of the support bracket and an emitting surface of the second lens of the first optical group may be greater than a distance between a surface of the support bracket and an emitting surface of the second lens of the second optical group.

The lamp for a vehicle may further include a first fixing plate configured to fix the first lens of the first optical group and the first lens of the second optical group to the first support; and a second fixing plate configured to fix the second lens of the first optical group and the second lens of the second optical group to the second support. Further, the second fixing plate may include a shield configured to obstruct some of the light from being transmitted through the second lens of the second optical group.

In the second optical part, the number of aspherical lenses among the plurality of lenses may be greater than the number of spherical lenses. The number of lenses with a positive refractive power among the plurality of lenses may be greater than the number of lenses with a negative refractive power.

In order to achieve the above object, a lamp for a vehicle according to another embodiment of the present disclosure may include a variable beam forming part configured to irradiate light and form variable beam patterns. In particular, the variable beam forming part may include a first optical part configured to irradiate the light; a reflection part including a plurality of micromirrors and configured to reflect the light from the first optical part; a second optical part configured to transmit the light reflected by the reflection part; and a housing configured to support the first optical part, the second optical part, and the reflection part. Postures of the plurality of micromirrors may be adjusted to a first posture in which the light incident from the first optical part is reflected in a first direction or to a second posture in which the light incident from the first optical part is reflected in a second direction. The second optical part may be disposed on a path of light reflected in the second direction by the plurality of micromirrors, and the first optical part may include a first optical group configured to irradiate light for forming a first variable beam pattern; and a second optical group configured to irradiate light for forming a second variable beam pattern different from the first variable beam pattern. The second optical part may include a plurality of lenses configured to transmit the light reflected from the reflection part. The reflection part may include a first reflection region for forming the first variable beam pattern; and a second reflection region for forming the second variable beam pattern.

The second reflection region may be disposed above the first reflection region. The area of the second reflection region may be larger than the area of the first reflection region. For specifically, a horizontal width of the second reflection region may be longer than a horizontal width of the first reflection region. The first variable beam pattern may be irradiated more upward than the second variable beam pattern. Further, the first variable beam pattern may be irradiated farther than the second variable beam pattern from the vehicle.

The lamp for a vehicle may further include a low beam forming part configured to form a low beam pattern; and a high beam forming part configured to form a high beam pattern. The first variable beam pattern may be included in the areas of the low beam pattern and the high beam pattern.

In some embodiments, the first variable beam pattern may include a road surface pattern to provide driving information to a driver. In some embodiments, the second variable beam pattern may include a road surface pattern to provide information different from information provided by the first variable beam pattern.

The area of the second variable beam pattern may be larger than the area of the first variable beam pattern. More specifically, the horizontal width of the second variable beam pattern may be longer than the horizontal width of the first variable beam pattern.

The technical aspects of the present disclosure are not restricted to those set forth herein, and other unmentioned technical aspects will be clearly understood by one of ordinary skill in the art to which the present disclosure pertains by referencing the detailed description of the present disclosure given below.

Lamps for vehicle according to embodiments of the present disclosure as described herein may provide an advantage of enabling safer driving due to the additional information provided using variable beam patterns formed with micromirrors.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
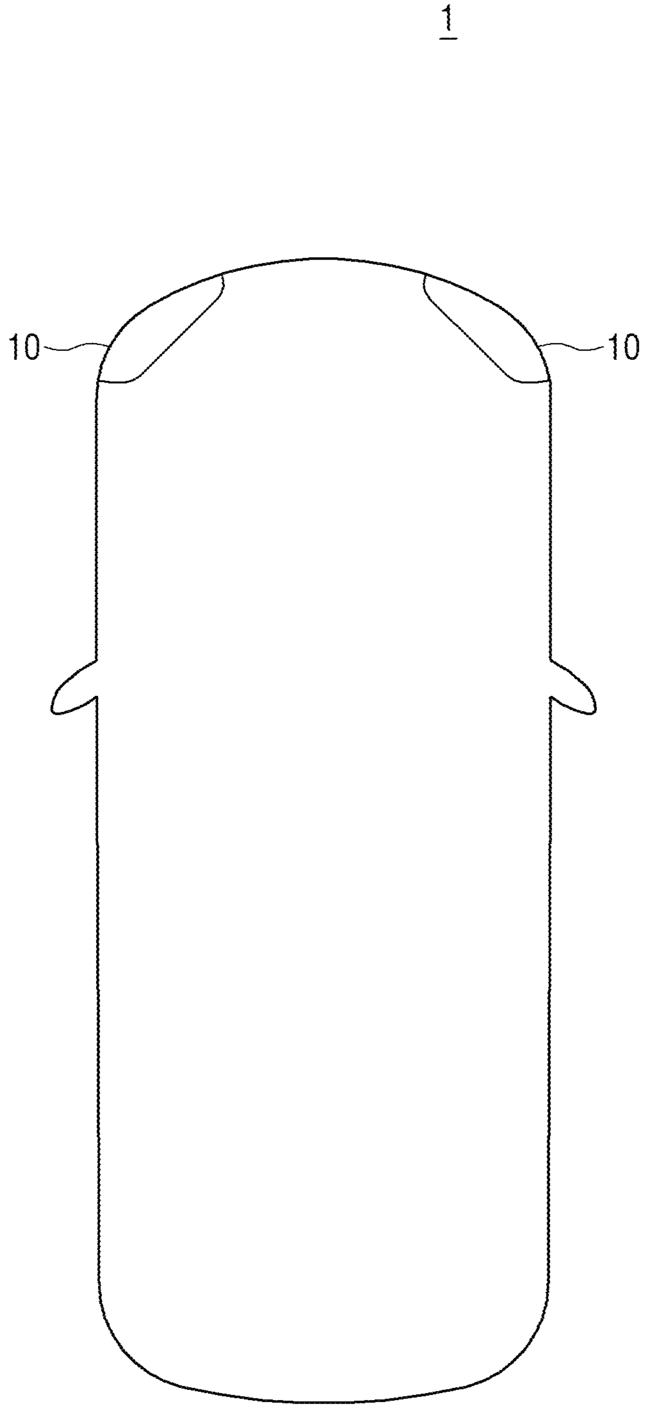
FIG. 1 illustrates a vehicle including a lamp for a vehicle.

Hereinafter, exemplary embodiments of the present disclosure will be described in detail with reference to the accompanying drawings. Advantages and features of the present disclosure, and a method of achieving them will be apparent with reference to the embodiments described below in detail together with the accompanying drawings. However, the present disclosure is not limited to the embodiments to be described below, but may be implemented in various different forms, and these embodiments are only provided to make the disclosure complete, and to fully inform the scope of the disclosure to those of ordinary skill in the technical field to which the present disclosure belongs. The invention is only defined by the scope of the claims. The same reference numerals refer to the same components throughout the specification.

Unless otherwise defined, all terms (including technical and scientific terms) used in the present specification may be used as meanings that can be commonly understood by those of ordinary skill in the art to which the present disclosure belongs. In addition, terms defined in a commonly used dictionary are not to be interpreted too ideally or excessively unless explicitly defined.

FIG. 1 illustrates a vehicle including a lamp for a vehicle. Referring to FIG. 1, a vehicle 1 may include a lamp 10. In an embodiment of the present disclosure, the lamps 10 for a vehicle may be installed on both sides of the front of the vehicle 1 to secure a front view when the vehicle 1 operates in low-light conditions (e.g., at night or in a dark place such as a tunnel). Accordingly, a case where the lamp 10 for a vehicle is used as the head lamp will be mainly described. However, this is only an example to help understand the present disclosure. The lamp 10 for a vehicle of the present disclosure is not limited to the head lamp, an may be used for various lamps installed in the vehicle 1, such as a fog lamp, a tail lamp, a brake lamp, a turn signal lamp, a position lamp, a daytime running lamp, and the like.

The lamp 10 for a vehicle may form a low beam pattern to secure a short-range view in front of the vehicle 1, as well as a high beam pattern HP (see FIG. 5) to secure a long-range view in front of the vehicle 1. In forming the high beam pattern HP, when there are other vehicles such as an on-coming vehicle or a preceding vehicle, the lamp 10 for a vehicle may form a shadow area by preventing light from being irradiated or reducing the amount of light irradiated to an area that corresponds to the position of the on-coming vehicle. With the formation of the shadow area, the occurrence of glare may be prevented or reduced to the driver of the on-coming vehicle.

The lamp 10 for a vehicle may include a first vehicle lamp 10 provided on the front left side of the vehicle 1 and a second vehicle lamp 10 provided on the front right side of the vehicle 1. In other words, the first vehicle lamp 10 may be understood as a left head lamp, and the second vehicle lamp 10 may be understood as a right head lamp.

In an embodiment of the present disclosure, a case where a plurality of vehicle lamps 10 are provided is described as an example since the vehicle lamp 10 of the present disclosure may be used as the head lamp. However, the number of the vehicle lamps 10 of the present disclosure is not limited thereto. In other words, the number, installation position, and installation direction of light irradiation parts may be variously changed based on the purpose of the vehicle lamp 10 of the present disclosure.

Figure 2:
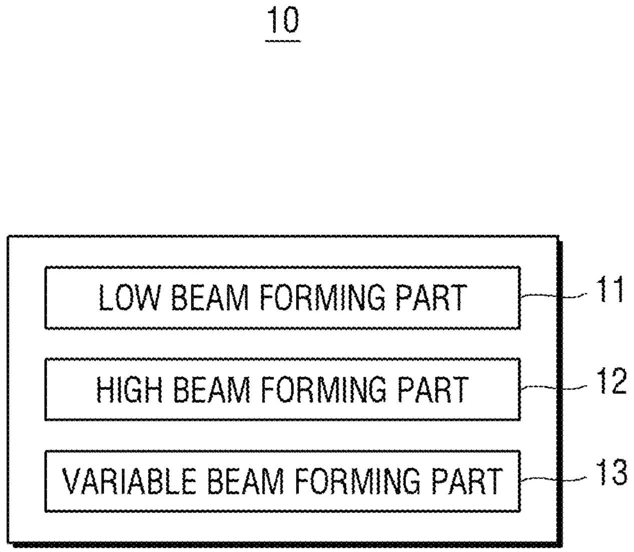
FIG. 2 is a block diagram of the lamp for a vehicle according to an embodiment of the present disclosure.

FIG. 2 is a block diagram of the lamp for a vehicle according to an embodiment of the present disclosure. Referring to FIG. 2, the lamp 10 for a vehicle may include a low beam forming part 11, a high beam forming part 12, and a variable beam forming part 13.

The low beam forming part 11 may irradiate light to form the low beam pattern LP (see FIG. 3), and the high beam forming part 12 may irradiate light to form the high beam pattern HP. In order to form the low beam pattern LP and the high beam pattern HP, each of the low beam forming part 11 and the high beam forming part 12 may include a light source, and at least one of a reflector or a lens.

Figure 7:
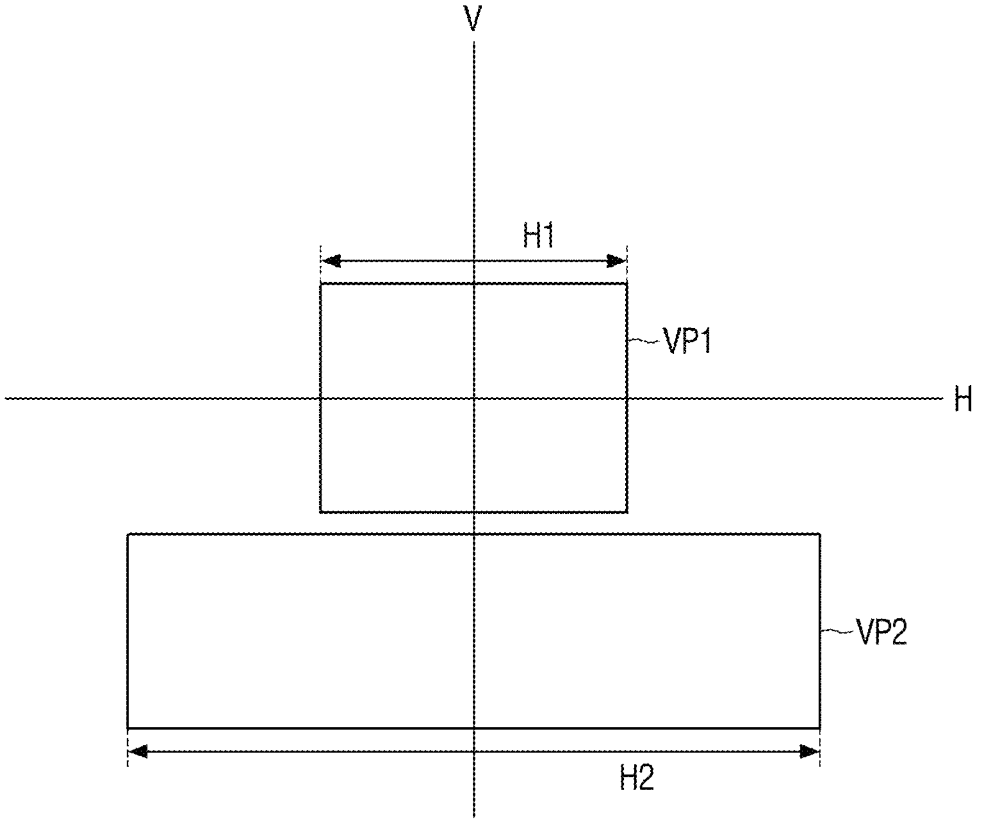
FIG. 7 illustrates a variable beam pattern formed by a variable beam forming part.

The variable beam forming part 13 may irradiate light to form variable beam patterns VP1 and VP2 (see FIG. 7). In the present disclosure, the variable beam patterns VP1 and VP2 may represent a beam pattern whose shape may be variously modified. For instance, light may be irradiated to some portions of the formation surface of the beam pattern, and no other portions of the formation surface. The area where light is irradiated and the area where no light is irradiated may be flexibly varied over time. When using the variable beam patterns VP1 and VP2, informational images such as letters, numbers, symbols, and any combination thereof may be formed on the formation surface of the beam pattern. In some embodiments, the variable beam patterns may be projected on a road surface.

Figure 3:
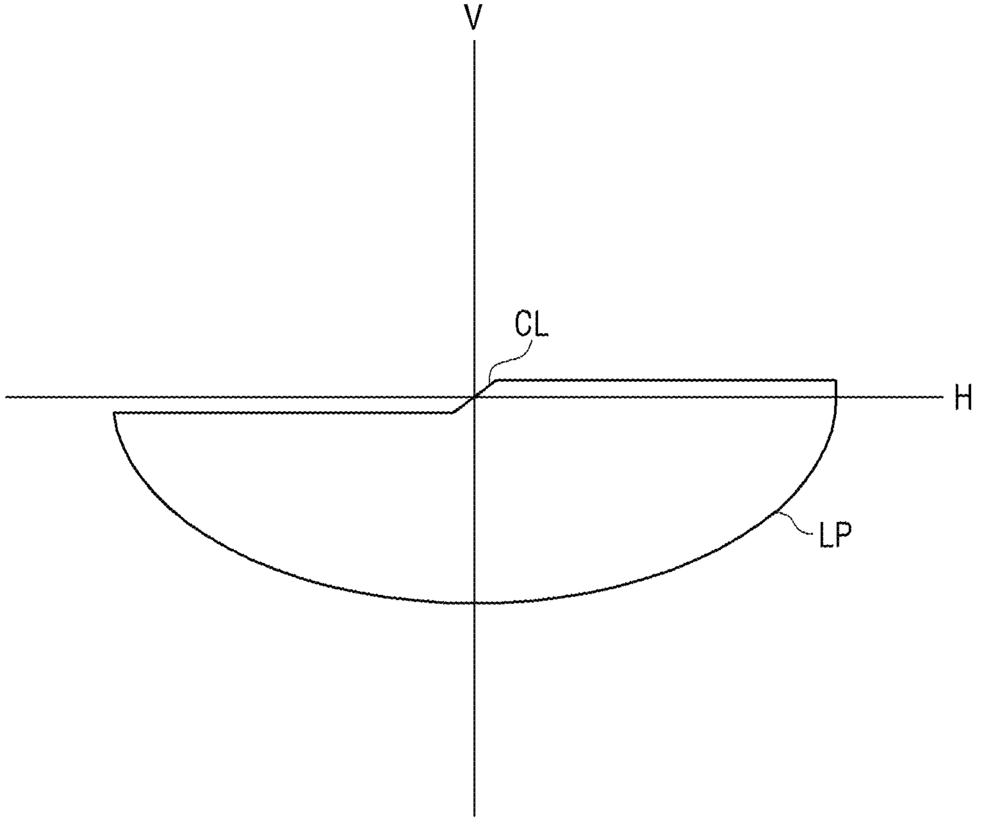
FIG. 3 illustrates a low beam pattern formed by a low beam forming part.
Figure 4:
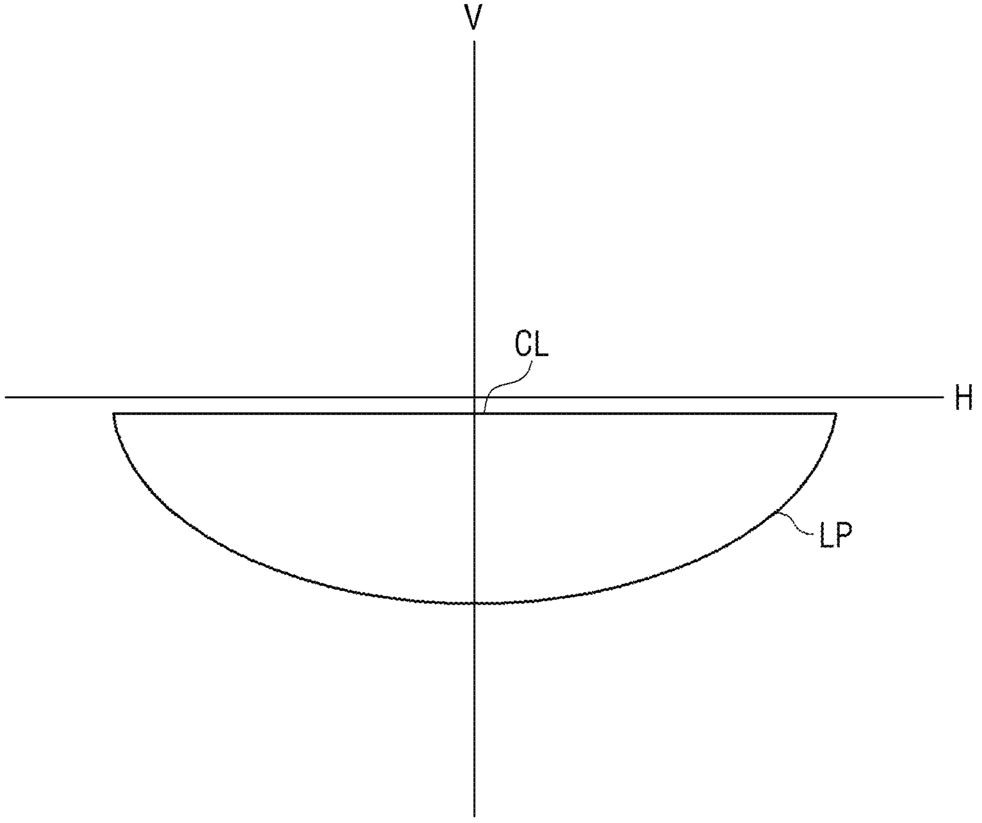
FIG. 4 illustrates a low beam pattern that includes a linear cut-off line.
Figure 5:
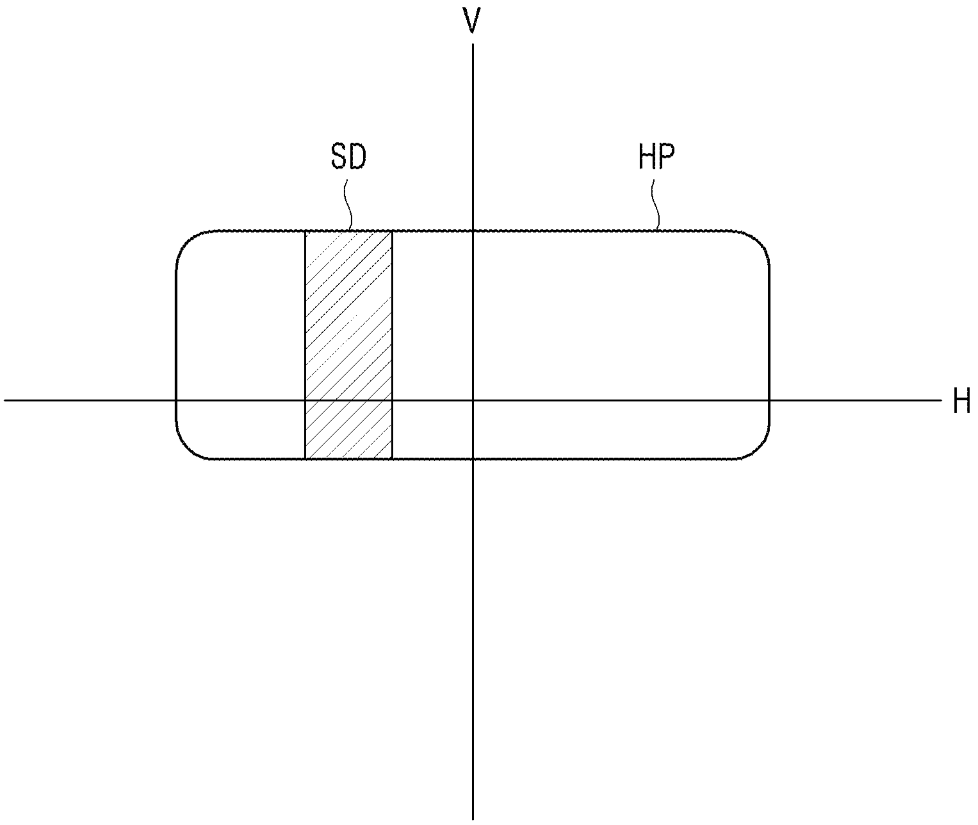
FIG. 5 illustrates a high beam pattern formed by a high beam forming part.
Figure 6:
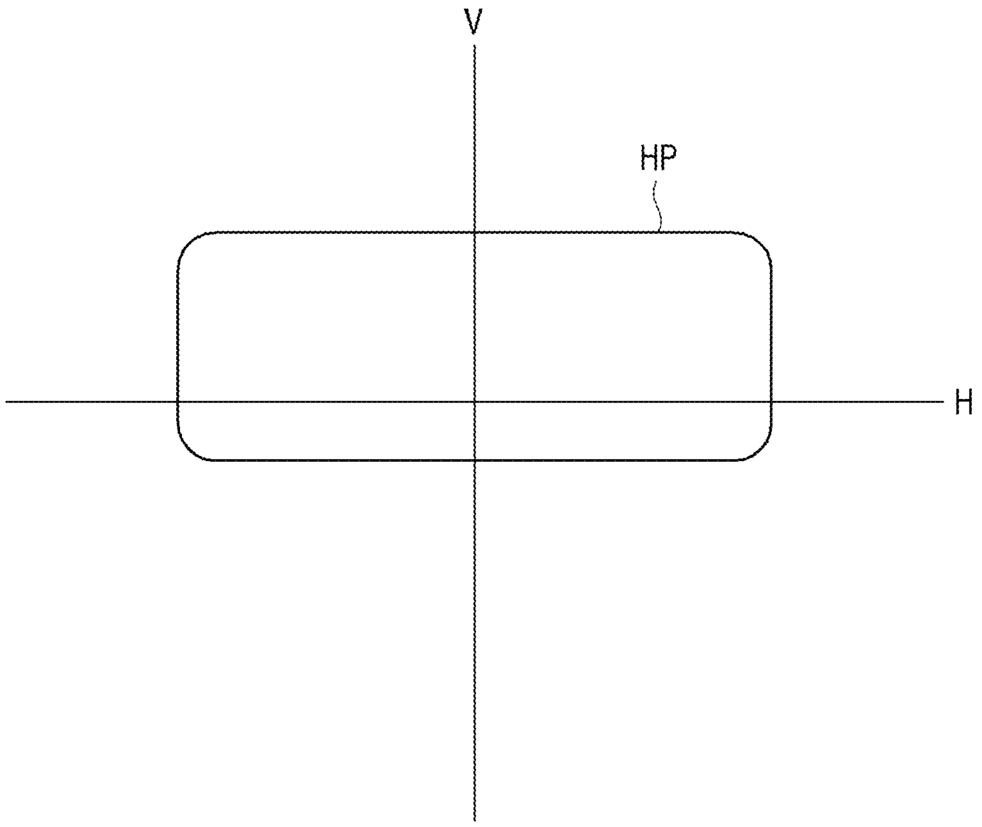
FIG. 6 illustrates a high beam pattern that does not include a shadow area.
Figure 8:
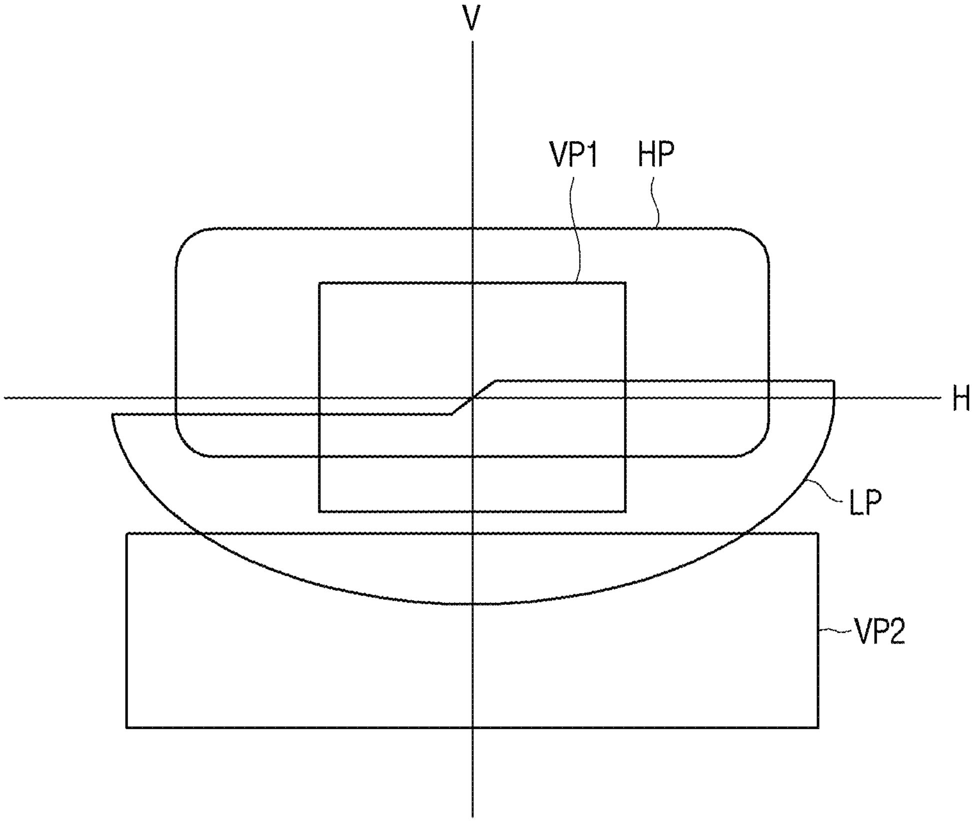
FIG. 8 illustrates a variable beam pattern that overlaps with the low beam pattern and the high beam pattern.

FIG. 3 illustrates the low beam pattern formed by the low beam forming part, FIG. 4 illustrates the low beam pattern including a linear cut-off line, FIG. 5 illustrates the high beam pattern formed by the high beam forming part, FIG. 6 illustrates the high beam pattern without a shadow area, FIG. 7 illustrates the variable beam pattern formed by the variable beam forming part, and FIG. 8 illustrates the variable beam pattern that overlaps with the low beam pattern and the high beam pattern.

Referring to FIG. 3, the low beam pattern LP may include a cut-off line CL. The cut-off line CL may include an inclined portion that crosses the center of the beam pattern formation surface. The left and right sides of the low beam pattern LP may have different heights with respect to the inclined portion. The low beam pattern LP may be formed in a short-range in front of the vehicle 1 to secure a short-range front view.

Meanwhile, according to another embodiment of the present disclosure, as illustrated in FIG. 4, the low beam pattern LP may include a substantially linear cut-off line CL. In such case, the left and right sides of the low beam pattern LP may have equal heights. The shape of the cut-off line CL may be determined pursuant to national and/or local regulations. Hereinafter, the low beam pattern LP including a cut-off line CL with an inclined portion, such as shown in FIG. 3, will be mainly described.

Referring to FIG. 5, the high beam pattern HP may selectively include a shadow area SD. The shadow area SD may represent an area in which substantially no light is irradiated. For instance, when another vehicle is disposed ahead, the high beam pattern HP may include the shadow area SD to prevent light from being irradiated to the corresponding area. The position and/or the number of the shadow area SD within the entire high beam pattern HP may be varied.

The arrangement of the shadow area within the high beam pattern HP may be performed by a separate control device. The control device may be configured to control the high beam forming part 12 to irradiate light based on the surrounding environment, and the high beam forming part 12 may form the high beam pattern HP in accordance with control instructions of the control device.

The high beam pattern HP may be formed in a long-distance in front of the vehicle 1 to secure a long-distance front view. For instance, the high beam pattern HP may be formed farther from the vehicle 1 than the low beam pattern LP.

Meanwhile, according to another embodiment of the present disclosure, as illustrated in FIG. 6, the high beam pattern HP may include no shadow area. In such case, substantially uniform light may be formed over the entire high beam pattern HP.

Referring to FIG. 7, the variable beam patterns VP1 and VP2 may include a first variable beam pattern VP1 and a second variable beam pattern VP2. The first variable beam pattern VP1 may correspond to a region having a predetermined size including the center of a beam pattern formation surface. The center of the first variable beam pattern VP1 may coincide with the center of the beam pattern formation surface or may be spaced apart from the center of the beam pattern formation surface by a predetermined distance.

Similarly to the first variable beam pattern VP1, the second variable beam pattern VP2 may correspond to a region having a predetermined size formed in a particular position on the beam pattern formation surface.

Areas occupied by each of the first variable beam pattern VP1 and the second variable beam pattern VP2 may be provided, for instance, in a rectangular shape. However, the shape of the first variable beam pattern VP1 and the second variable beam pattern VP2 of the present disclosure is not limited to the rectangular shape and may be provided in shapes other than the rectangular shape (e.g., a polygonal shape, an elliptical shape, or any other geometric shape). Hereinafter, the first variable beam pattern VP1 and the second variable beam pattern VP2 that forms a substantially rectangular shape will be mainly described.

The area of the second variable beam pattern VP2 may be greater than the area of the first variable beam pattern VP1. Specifically, a horizontal length H2 of the second variable beam pattern VP2 may be greater than a horizontal length H1 of the first variable beam pattern VP1. Since the first variable beam pattern VP1 is irradiated to a longer distance from the vehicle 1 than the second variable beam pattern VP2, both the short-distance and the long-distance front views may be improved over a wide area as the first variable beam pattern may diffuse even though it is irradiated with a relatively narrower area. Meanwhile, the second variable beam pattern VP2 may be irradiated to a shorter distance from the vehicle 1 than the first variable beam pattern VP1.

A predetermined gap may be formed between the first variable beam pattern VP1 and the second variable beam pattern VP2. In other words, the first variable beam pattern VP1 and the second variable beam pattern VP2 may not overlap each other. In the present disclosure, the first variable beam pattern VP1 and the second variable beam pattern VP2 may not be formed concurrently. For instance, when the first variable beam pattern VP1 is formed, the second variable beam pattern VP2 may not be formed, and when the second variable beam pattern VP2 is formed, the first variable beam pattern VP1 may not be formed.

Referring to FIG. 8, the variable beam patterns VP1 and VP2 may overlap with the low beam pattern LP and the high beam pattern HP. As described above, the first variable beam pattern VP1 may be formed in the center of the beam pattern formation surface or may be disposed adjacent to the center thereof. For example, the first variable beam pattern VP1 may be formed above the second variable beam pattern VP2 and may be included in the areas of the low beam pattern LP and the high beam pattern HP. Accordingly, the first variable beam pattern VP1 may be formed farther than the second variable beam pattern VP2 and may increase the brightness of a corresponding portion by assisting the low beam pattern LP or the high beam pattern HP. A short-distance or long-distance front view may be further improved due to the first variable beam pattern VP1.

In addition, the first variable beam pattern VP1 may include a road surface pattern to provide driving information to the driver. For instance, in the first variable beam pattern VP1, driving information such as a driving direction, driving speed, or traffic information may be formed on the road surface in the form of an image such as a letter, a number, a symbol, or any combination thereof.

Similarly to the first variable beam pattern VP1, the second variable beam pattern VP2 may include a road surface pattern to provide driving information to the driver. For instance, in the second variable beam pattern VP2, driving information such as a driving direction, driving speed, or traffic information may be formed on the road surface in the form of an image such as a letter, a number, a symbol, or any combination thereof.

In addition, the second variable beam pattern VP2 may include a road surface pattern to provide information associated with welcoming (e.g., "welcome") or farewell (e.g., "goodbye"). For example, when the driver approaches or moves away from the vehicle 1, the second variable beam pattern VP2 may be formed on the road surface, which includes a light pattern, an image, or a text that means a welcoming or a farewell sign to the driver.

The second variable beam pattern VP2 may be formed closer to the vehicle 1 than the low beam pattern LP. For example, the second variable beam pattern VP2 may be formed within 3 to 10 meters in front of the vehicle 1.

According to some embodiments of the present disclosure, the second variable beam pattern VP2 may include a road surface pattern to provide information different from the road surface pattern of the first variable beam pattern VP1. For instance, when the first variable beam pattern VP1 includes the driving information of the vehicle, the second variable beam pattern VP2 may include information that is different and unrelated to the driving information of the vehicle or may include information that is different and related to the driving information of the vehicle.

Figure 9:
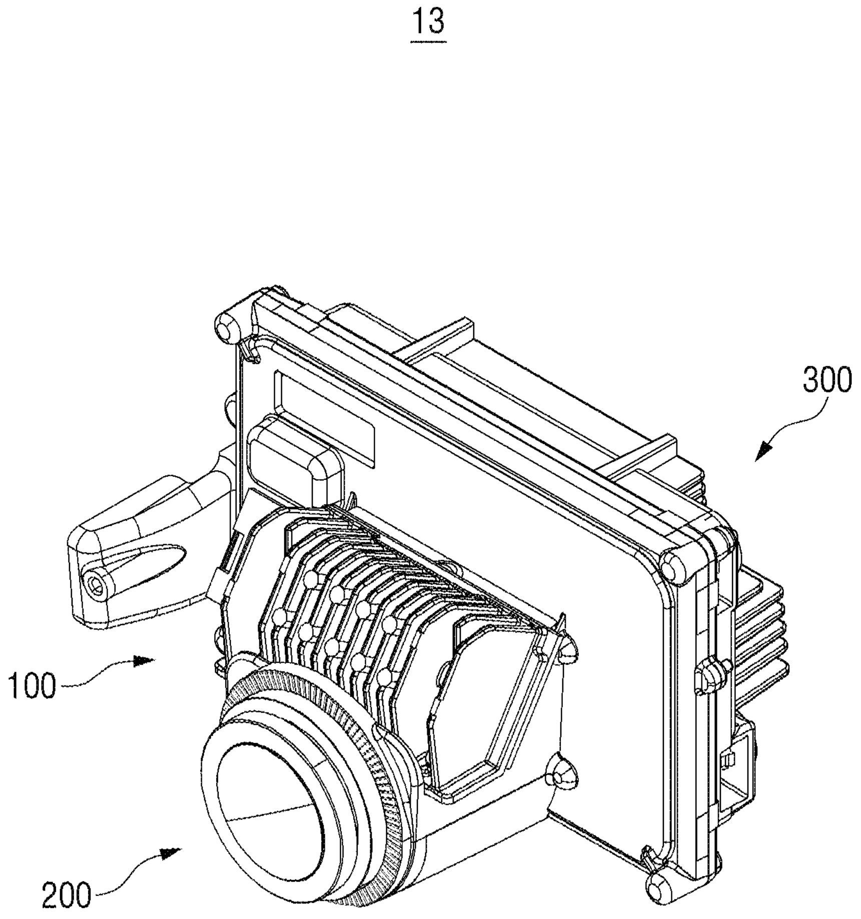
FIG. 9 is a perspective view of the variable beam forming part of the lamp for vehicle according to an embodiment of the present disclosure.
Figure 10:
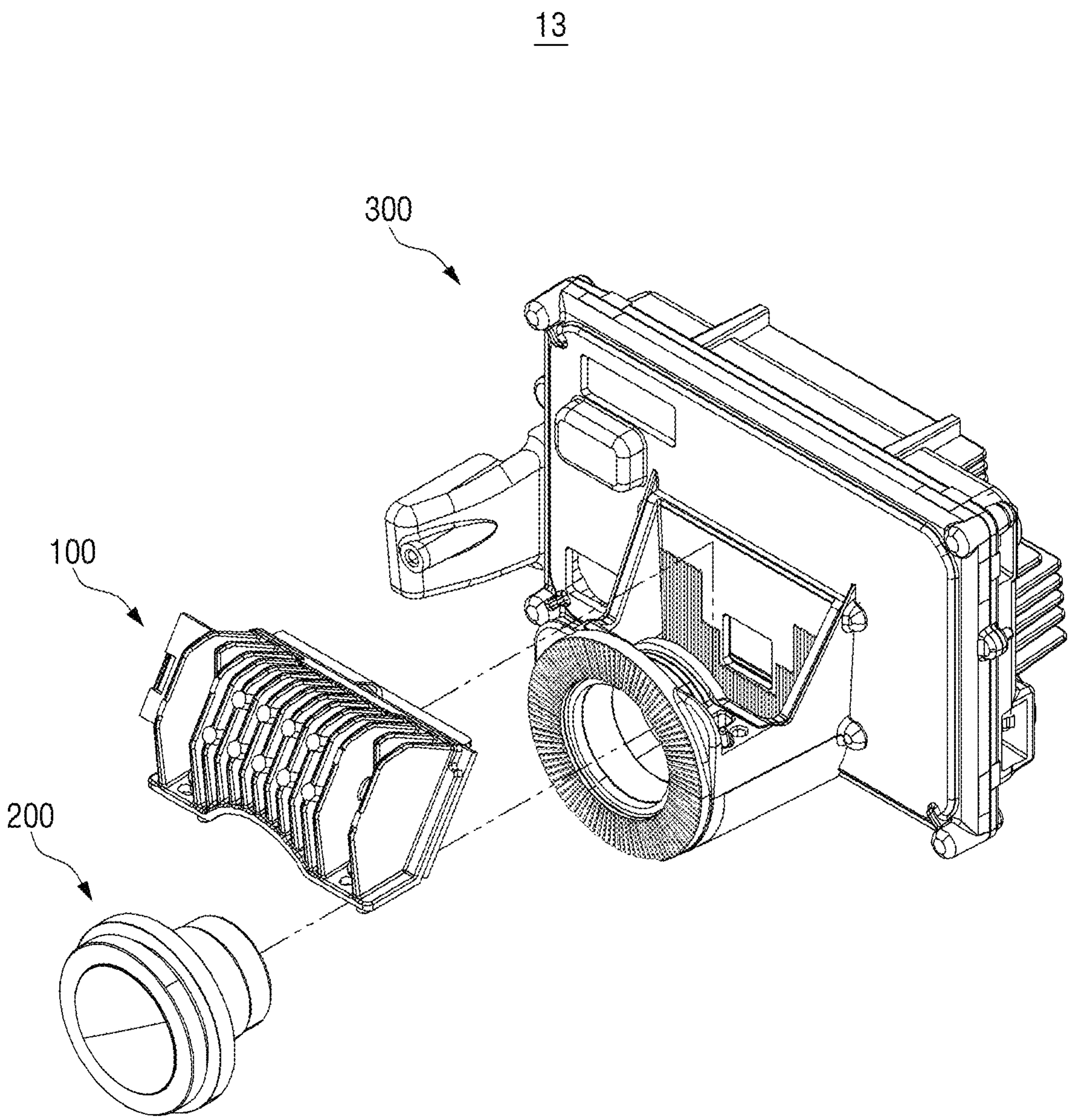
FIG. 10 is an exploded perspective view of the variable beam forming part.

FIG. 9 is a perspective view of the variable beam forming part, and FIG. 10 is an exploded perspective view of the variable beam forming part. Referring to FIGS. 9 and 10, the variable beam forming part 13 may include a first optical part 100, a second optical part 200, and a beam pattern forming part 300.

The first optical part 100 may irradiate light. The first optical part 100 may include a first optical group 181 (see FIG. 22) and a second optical group 182 (see FIG. 22). The first optical group 181 may irradiate light for forming the first variable beam pattern VP1, and the second optical group 182 may irradiate light for forming the second variable beam pattern VP2. The light of the first optical group 181 and the light of the second optical group 182 may be reflected and subsequently irradiated towards the front the vehicle 1. A detailed description of the first optical part 100 will be provided later below with reference to FIGS. 15 to 29.

The beam pattern forming part 300 may reflect the light of the first optical part 100 to form the variable beam patterns VP1 and VP2. The light irradiated by the first optical part 100 may be reflected by the beam pattern forming part 300 to form the variable beam patterns VP1 and VP2. The beam pattern forming part 300 may form a beam pattern of a particular shape by reflecting some portions of the incident light towards the second optical part 200 and reflecting other portions of the incident light so that they do not reach the second optical part 200. A detailed description of the beam pattern forming part 300 will be provided later below with reference to FIGS. 11 to 14.

The second optical part 200 may transmit the light from the beam pattern forming part 300. The second optical part 200 may condense and irradiate the incident light. Accordingly, the first variable beam pattern VP1 and the second variable beam pattern VP2 of the aforementioned shape may be formed. For condensation of light, the second optical part 200 may include a plurality of lenses. The light incident on the second optical part 200 may be condensed and emitted by being transmitted through the plurality of lenses. A detailed description of the second optical part 200 will be provided later below with reference to FIGS. 32 to 38.

Figure 11:
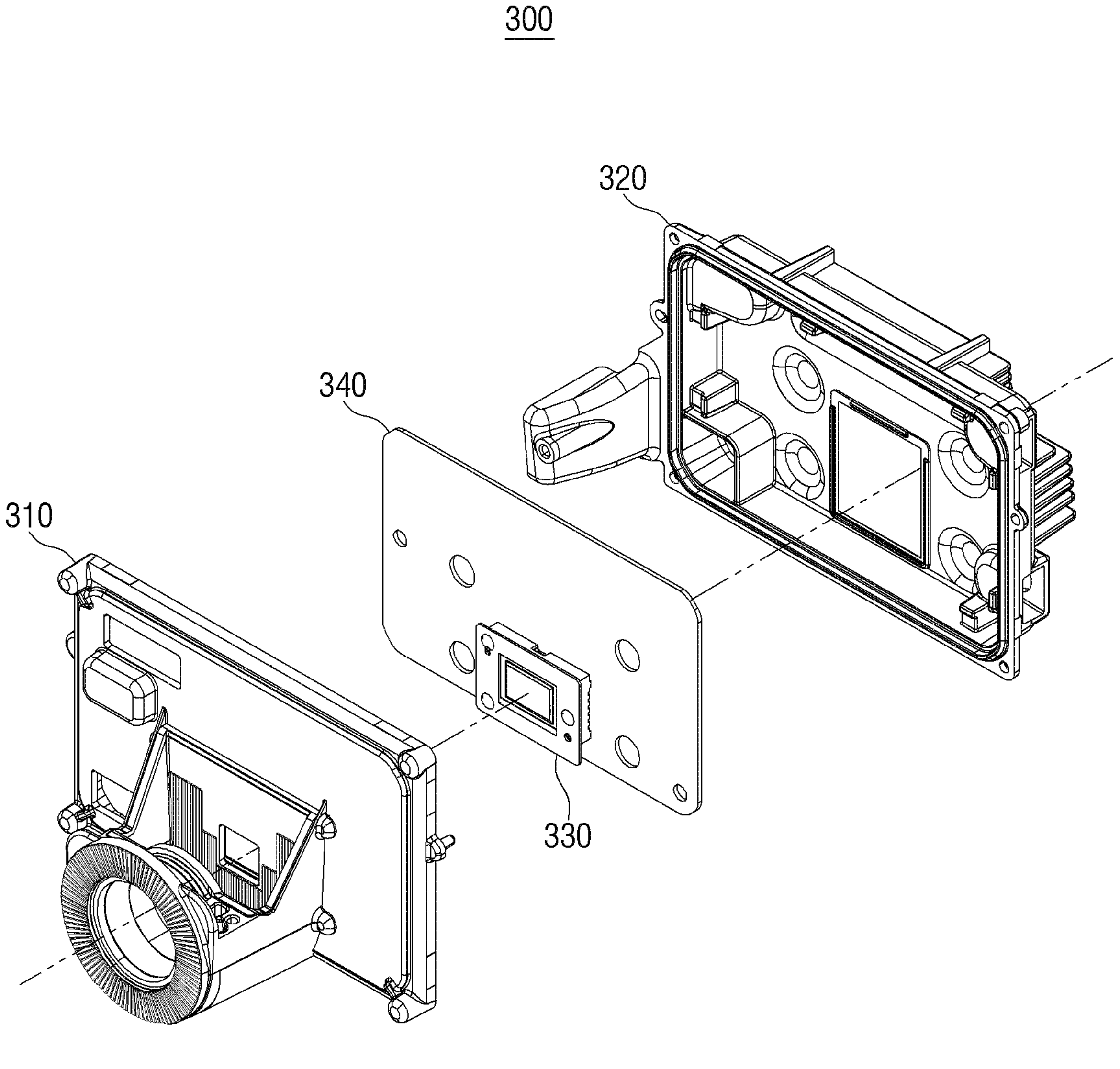
FIG. 11 is an exploded perspective view of a beam pattern forming part of the variable beam forming part.
Figure 12:
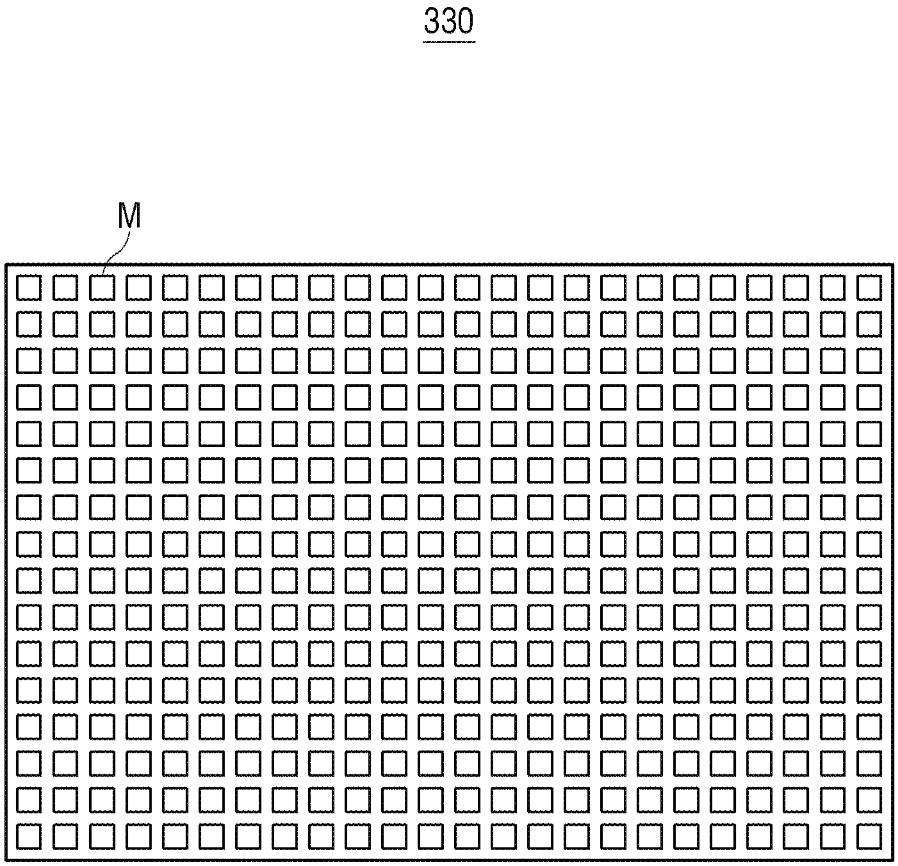
FIG. 12 is a top plan view of a reflection part of the beam pattern forming part.
Figure 13:
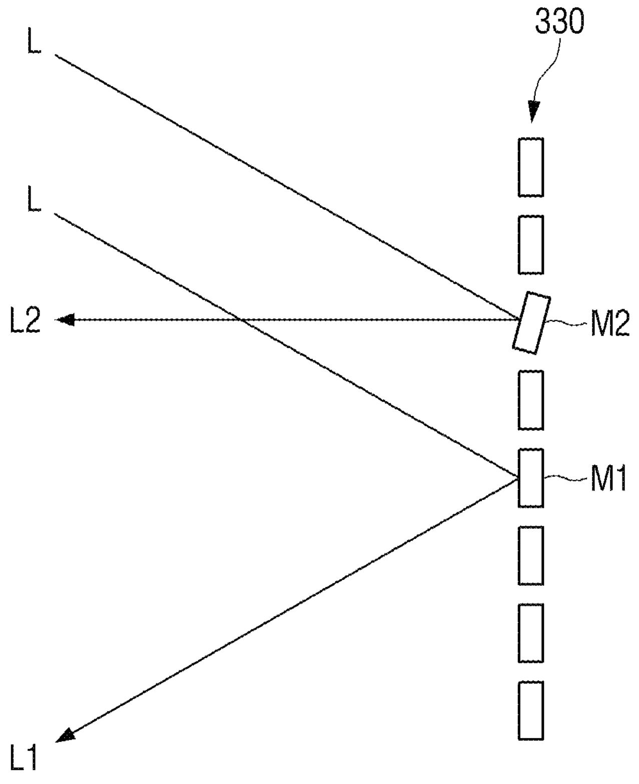
FIG. 13 depicts an operating principle of the reflection part of the lamp for vehicle according to an embodiment of the present disclosure.
Figure 14:
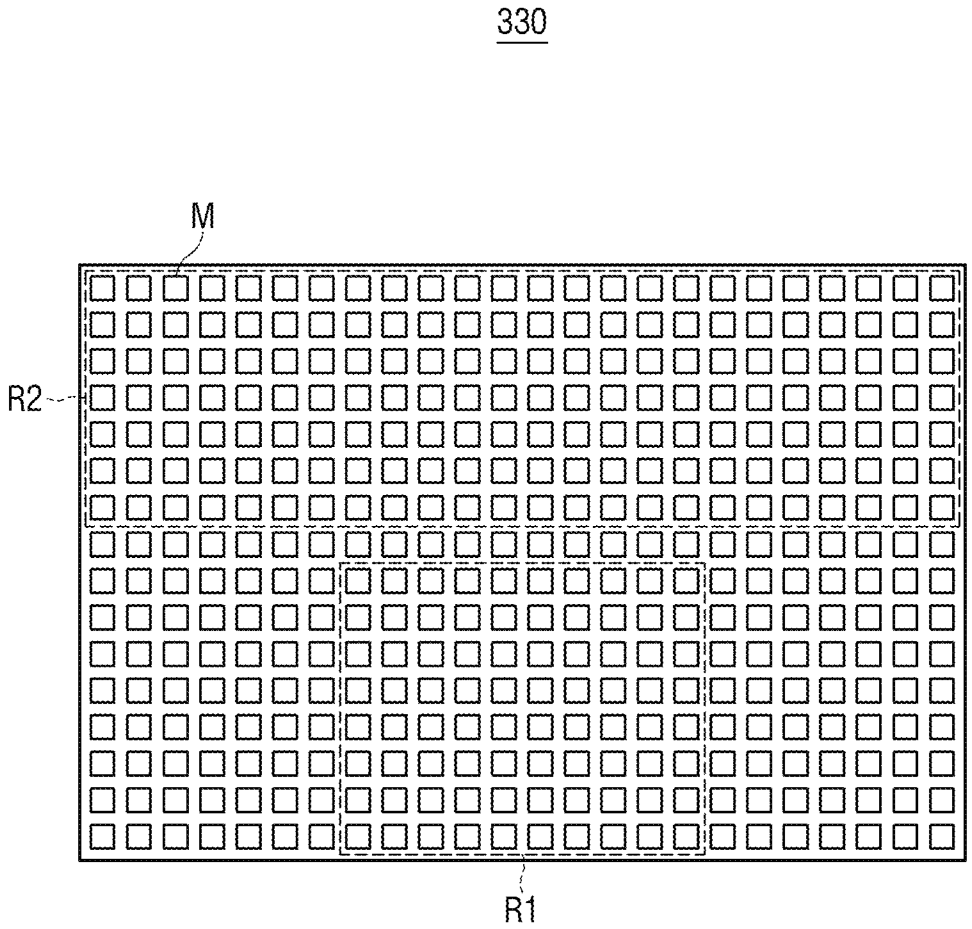
FIG. 14 depicts reflection regions of the reflection part of the lamp for vehicle according to an embodiment of the present disclosure.

FIG. 11 is an exploded perspective view of the beam pattern forming part, FIG. 12 is a top plan view of a reflection part, FIG. 13 is a view describing an operating principle of the reflection part, and FIG. 14 is a view describing reflection regions of the reflection part.

Referring to FIG. 11, the beam pattern forming part 300 may include housings 310 and 320, a reflection part 330, and a substrate 340.

The housings 310 and 320 may include a first housing 310 and a second housing 320. The first housing 310 and the second housing 320 may be coupled to each other to provide an accommodation space for the reflection part 330 and the substrate 340. The first housing 310 may be coupled to the first optical part 100 and the second optical part 200. The reflection part 330, the substrate 340, the first optical part 100, and the second optical part 200 may be accommodated in the housings 310 and 320 and/or coupled thereto, thus allowing the lamp 10 for a vehicle to operate integrally.

Referring to FIG. 12, the reflection part 330 may include a plurality of micromirrors M. The micromirrors M may reflect the light incident from the first optical part 100. In particular, the posture of the plurality of micromirrors M may be individually adjusted. Furthermore, an irradiation angle of reflected light may be varied depending on the posture of each micromirror M. In other words, the light incident on the reflection part 330 may be reflected by the plurality of micromirrors M, and the irradiation angle of partial light reflected by a micromirror M may be varied depending on the posture of the micromirror M.

Referring to FIG. 13, the postures of the micromirrors M1 and M2 may be adjusted. Specifically, the postures of each of the micromirrors M1 and M2 constituting the reflection part 330 may be individually determined.

In the present disclosure, the micromirrors M1 and M2 may include at least two positions. FIG. 13 illustrates the micromirror M1 disposed at a first posture and the micromirror M2 disposed at a second posture. By being disposed at the first posture, the micromirror M1 may reflect an incident light L and irradiate the same in a first direction L1. Meanwhile, by being disposed at the second posture, the micromirror M2 may reflect the incident light L and irradiate the same in a second direction L2 that is different from the first direction L1.

The plurality of micromirrors M1 and M2 included in the reflection part 330 may each have the posture for collectively forming a specific image. For instance, the plurality of micromirrors M1 and M2 may have the postures for forming an image of an arrow. When the micromirrors M2 corresponding to the image of the arrow have the second posture and the remaining micromirrors M1 have the first posture, the variable beam patterns VP1 and VP2 may be formed to include a driving information image of the arrow.

The micromirror M according to an embodiment of the present disclosure may be implemented with known technologies such as disclosed in, for example, Korean Patent Application Publication No. 10-2019-0063984 published on Jun. 10, 2019, relevant portions of which are incorporated herein by reference.

Referring to FIG. 14, the reflection part 330 may include a first reflection region R1 and a second reflection region R2. The first reflection region R1 may be configured to form the first variable beam pattern VP1, and the second reflection region R2 may be configured to form the second variable beam pattern VP2. At least some of the selected micromirrors M included in the first reflection region R1 may reflect light to form the first variable beam pattern VP1, and at least some of the selected micromirrors M included in the second reflection region R2 may reflect light to form the second variable beam pattern VP2.

The first reflection region R1 may have a similar shape to the first variable beam pattern VP1, and the second reflection region R2 may have a similar shape to the second variable beam pattern VP2. Specifically, the area of the second reflection region R2 may be formed to be greater than that of the first reflection region R1, and the horizontal length of the second reflection region R2 may be formed to be greater than the horizontal length of the first reflection region R1.

The second reflection region R2 may be disposed above the first reflection region R1. In the present disclosure, the light reflected in the first reflection region R1 and the light reflected in the second reflection region R2 may intersect each other and be irradiated to the second optical part 200. Specifically, the light reflected on the first reflection region R1 may be irradiated more upwards as compared to the light reflected on the second reflection region R2, and the light reflected in the second reflection region R2 may be irradiated more downwards as compared to the light reflected in the first reflection region R1. Accordingly, the light reflected on the first reflection region R1 may be incident on an upper side of the second optical part 200 as compared to the light reflected on the second reflection region R2, and the light reflected on the second reflection region R2 may be incident on a lower side of the second optical part 200 as compared to the light reflected on the first reflection region R1.

The light reflected on the first reflection region R1 may be irradiated farther than the light reflected on the second reflection region R2 to form the first variable beam pattern VP1, and the light reflected on the second reflection region R2 may be irradiated closer than the light reflected on the first reflection region R1 to form the second variable beam pattern VP2.

Referring back to FIG. 11, the substrate 340 may support the reflection part 330. For example, the reflection part 330 may be coupled to a slot provided in the substrate 340. In turn, the substrate 340 may be coupled to the housings 310 and 320. Accordingly, the position of the reflection part 330 may be fixed together with the substrate 340 inside the housings 310 and 320. The substrate 340 may receive electric power from outside and may transmit the power to the reflection part 330. The reflection part 330 may operate with the power transmitted from the substrate 340 and may reflect the incident light in a specific pattern.

Figure 15:
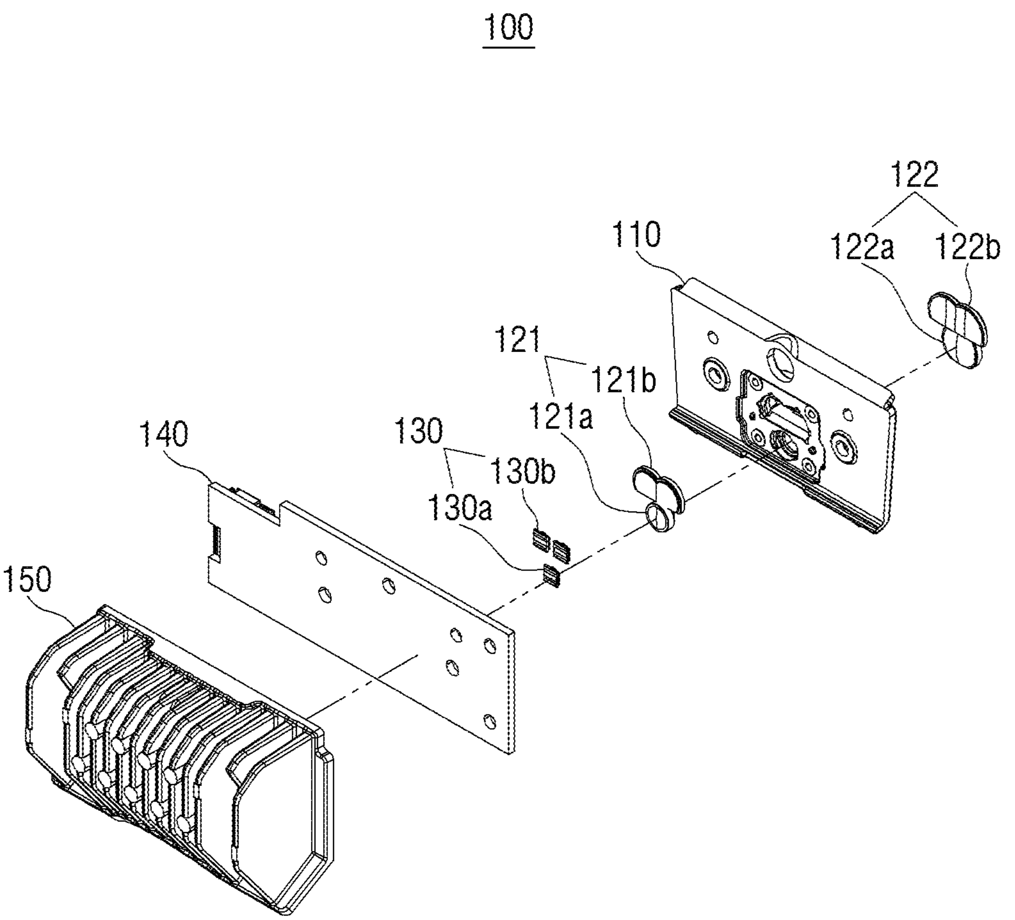
FIG. 15 is an exploded perspective view of a first optical part of the lamp for vehicle according to an embodiment of the present disclosure.

FIG. 15 is an exploded perspective view of the first optical part. Referring to FIG. 15, the first optical part 100 may include a support bracket 110, a first lens part 121, a second lens part 122, a light source part 130, a substrate 140, and a heat dissipation part 150.

The support bracket 110 may support the first lens part 121 and the second lens part 122. The first lens part 121 may include a first lens 121*a* belonging to a first optical group 181 and a first lens 121*b* belonging to a second optical group 182. The second lens part 122 may include a second lens 122*a* belonging to the first optical group 181 and a second lens 122*b* belonging to the second optical group 182. The first lens part 121 and the second lens part 122 may transmit light while they remain spaced apart from each other by a predetermined distance by the support bracket 110.

The light source part 130 may irradiate light. The light source part 130 may include a first light source 130*a* belonging to the first optical group 181 and a second light source 130*b* belonging to the second optical group 182. The first light source 130*a* may irradiate light to the first lens 121*a* of the first optical group 181, and the second light source 130*b* may irradiate light to the first lens 121*b* of the second optical group 182.

The substrate 140 may support the light source part 130. The substrate 140 may receive electric power from outside and may transmit the power to the light source part 130. The light source part 130 may irradiate light by being operated with the power transmitted from the substrate 140.

The heat dissipation part 150 may cool the first optical group 181 and the second optical group 182. To this end, the heat dissipation part 150 may be in thermal contact with the substrate 140. The light source part 130 may be disposed on one surface of the substrate 140, and the heat dissipation part 150 may be disposed on the opposite surface. The heat dissipation part 150 may include at least one heat dissipation fin. The light source part 130 may be cooled due to heat exchange at the heat dissipation fins.

Figure 16:
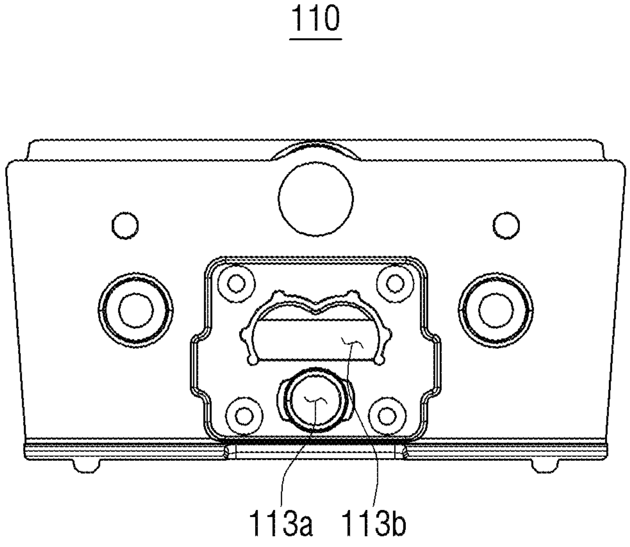
FIG. 16 is a top plan view of a support bracket of the first optical part.

FIG. 16 is a top plan view of the support bracket. Referring to FIG. 16, the support bracket 110 may include a first light transmitting aperture 113*a* and a second light transmitting aperture 113*b*. The first light transmitting aperture 113*a* may transmit the light of the first light source 130*a*, and the second light transmitting aperture 113*b* may transmit the light of the second light source 130*b*. The second light transmitting aperture 113*b* may be formed to be larger than the first light transmitting aperture 113*a*. For instance, the area of the second light transmitting aperture 113*b* may be greater than the area of the first light transmitting aperture 113*a*. Specifically, the horizontal length of the second light transmitting aperture 113*b* may be longer than the horizontal length of the first light transmitting aperture 113*a*.

Figure 17:
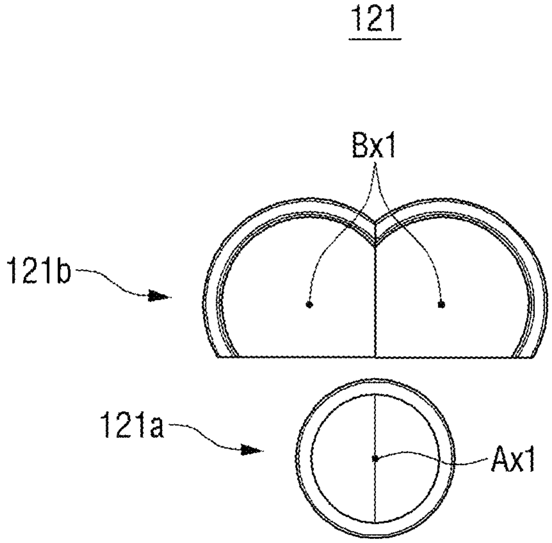
FIG. 17 illustrates a first lens part of the first optical part.

FIG. 17 illustrates the first lens part. Referring to FIG. 17, the first lens part 121 may include the first lens 121*a* of the first optical group 181 and the first lens 121*b* of the second optical group 182. In some embodiments, the first lens 121*a* of the first optical group 181 may include one lens, and the first lens 121*b* of the second optical group 182 may include two lenses. The first lens 121*b* of the second optical group 182 may include planar surfaces and may be bonded by bonding the planar surfaces to each other. Alternatively, the first lens 121*b* of the second optical group 182 may be formed from a single material to include two lens portions with different focal lengths.

The area of the first lens 121*b* of the second optical group 182 may be formed to be greater than the area of the first lens 121*a* of the first optical group 181. Specifically, a horizontal length of the first lens 121*b* of the second optical group 182 may be formed longer than a horizontal length of the first lens 121*a* of the first optical group 181.

The first lens 121*a* of the first optical group 181 and the first lens 121*b* of the second optical group 182 may be disposed adjacent to each other. For instance, the first lens 121*b* of the second optical group 182 may be disposed adjacent to an upper side of the first lens 121*a* of the first optical group 181. At least one of the first lens 121*a* of the first optical group 181 or the first lens 121*b* of the second optical group 182 may be formed so that a portion of the lens that faces the other is planar. FIG. 17 illustrates an example where the first lens 121*b* of the second optical group 182 is formed with a planar (e.g., linear) shape.

Due to the planar portion of the lens, an optical axis Ax1 of the first lens 121*a* of the first optical group 181 and an optical axis Bx1 of the first lens 121*b* of the second optical group 182 may be kept closer to each other, thereby allowing the light from the first light source 130*a* and the second light source 130*b* to be more easily condensed to the reflection part 330.

A flange may be formed on edges of the first lens 121*a* of the first optical group 181 and the first lens 121*b* of the second optical group 182. The flange may abut an edge of the light transmitting aperture of the support bracket 110 and may abut an edge of a first support 111 (see FIG. 19) to be described below. As opposite surfaces of the flange abut the support bracket 110 and the first support 111, the positions of the first lens 121*a* of the first optical group 181 and the first lens 121*b* of the second optical group 182 may be fixed on the support bracket 110.

Figure 18:
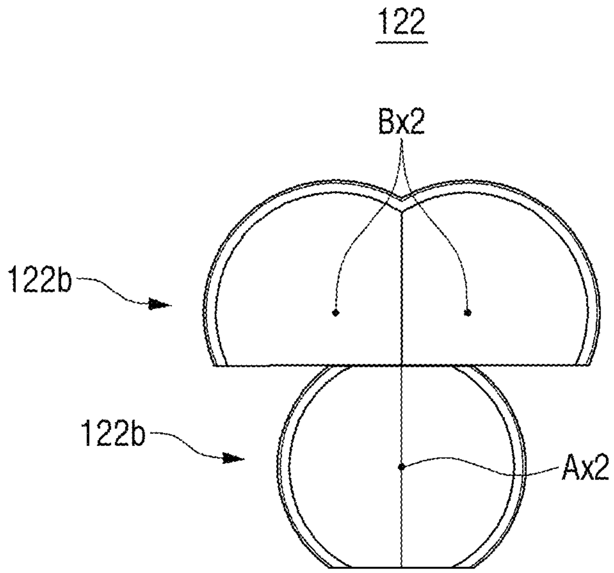
FIG. 18 illustrates a second lens part of the first optical part.

FIG. 18 illustrates the second lens part. Referring to FIG. 18, the second lens part 122 may include the second lens 122*a* of the first optical group 181 and the second lens 122*b* of the second optical group 182. In some embodiments, the second lens 122*a* of the first optical group 181 may include one lens, and the second lens 122*b* of the second optical group 182 may include two lenses. The second lens 122*b* of the second optical group 182 may include planar surfaces and may be bonded by bonding the planar surfaces to each other. Alternatively, the second lens 122*b* of the second optical group 182 may be configured from a single material to include two lens portions with different focal lengths.

As the two lenses are bonded to each other, the area of the second lens 122*b* of the second optical group 182 may be formed to be greater than the area of the second lens 122*a* of the first optical group 181. Specifically, a horizontal length of the second lens 122*b* of the second optical group 182 may be formed longer than a horizontal length of the second lens 122*a* of the first optical group 181.

The second lens 122*a* of the first optical group 181 and the second lens 122*b* of the second optical group 182 may be disposed adjacent to each other. For instance, the second lens 122*b* of the second optical group 182 may be disposed adjacent to an upper side of the second lens 122*a* of the first optical group 181. At least one of the second lens 122*a* of the first optical group 181 or the second lens 122*b* of the second optical group 182 may be formed so that a portion of the lens that faces the other is planar. FIG. 18 illustrates an example where the second lens 122*b* of the second optical group 182 is formed with a planar (e.g., linear) shape.

Due to the planar portion of the lens, an optical axis Ax2 of the second lens 122*a* of the first optical group 181 and an optical axis Bx2 of the second lens 122*b* of the second optical group 182 may be kept closer to each other, thereby allowing the light from the first light source 130*a* and the second light source 130*b* to be more easily condensed to the reflection part 330.

A flange may be formed on edges of the second lens 122*a* of the first optical group 181 and the second lens 122*b* of the second optical group 182. The flange may abut the edge of the light transmitting aperture of the support bracket 110 and may abut an edge of a second support 112 (see FIG. 20) to be described below. As opposite surfaces of the flange abut the support bracket 110 and the second support 112, the positions of the second lens 122*a* of the first optical group 181 and the second lens 122*b* of the second optical group 182 may be fixed on the support bracket 110.

Figure 19:
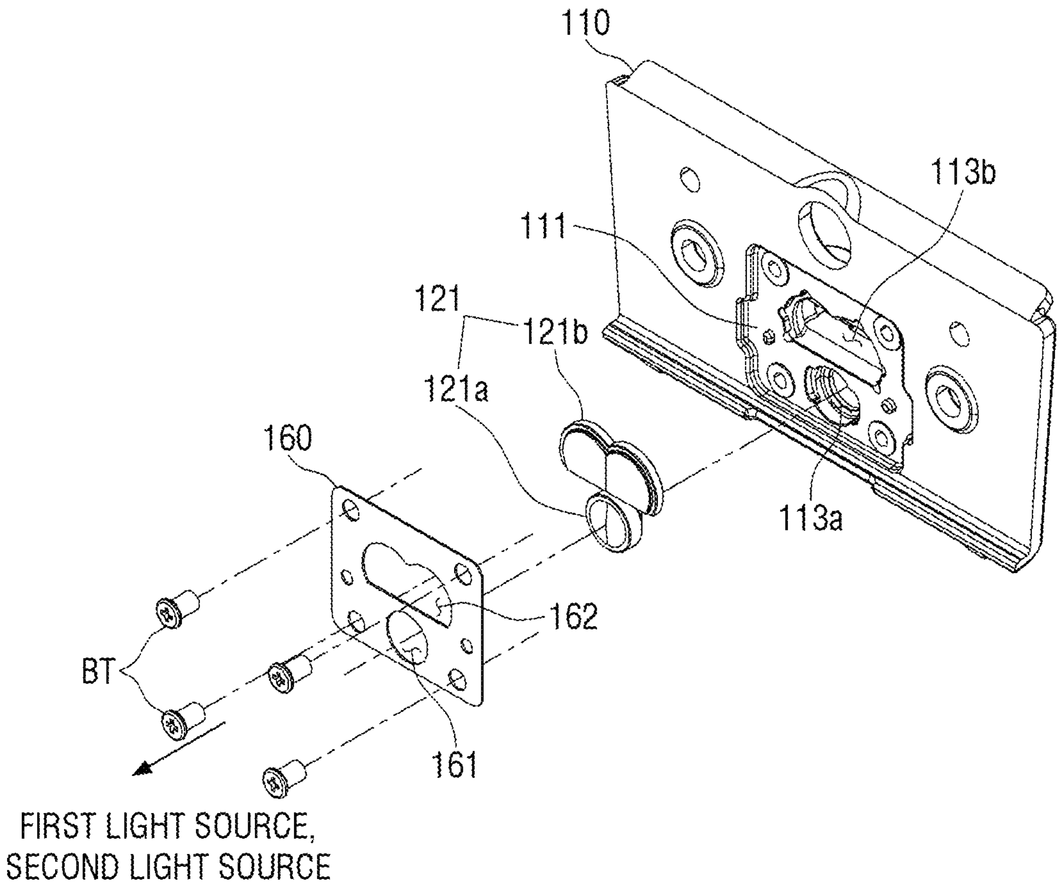
FIG. 19 depicts a coupling relationship between the first lens part and the support bracket.

FIG. 19 depicts a coupling relationship between the first lens part and the support bracket. Referring to FIG. 19, the support bracket 110 may include a first support 111 configured to support the first lens part 121. The first support 111 may be disposed facing towards the first light source 130*a* and the second light source 130*b* and may support the first lens 121*a* of the first optical group 181 and the first lens 121*b* of the second optical group 182. The first support 111 may be formed so that a surface of the support bracket 110 is recessed inwards by a predetermined depth. For instance, the recess depth of the first support 111 may correspond to the thickness of a first fixing plate 160 described below.

The first fixing plate 160 may be used to fix the first lens part 121 to the first support 111. The first fixing plate 160 may fix the first lens 121*a* of the first optical group 181 and the first lens 121*b* of the second optical group 182 to the first support 111. The first fixing plate 160 may include a first light transmitting aperture 161 and a second light transmitting aperture 162. The first fixing plate 160 may transmit light from the first light source 130*a* and the second light source 130*b* through the first light transmitting aperture 161 and the second light transmitting aperture 162, respectively. Furthermore, the first fixing plate 160 may provide a shielding function of obstructing the light in the areas other than the light transmitting apertures 161 and 162. As the light is transmitted only through the light transmitting apertures 161 and 162, and the light may be blocked from being incident into the lenses 121*a* and 121*b* included in the first lens part 121 through the remaining area of the first fixing plate 160, an intended beam pattern may be formed, and the occurrence of glare may be prevented more effectively.

The first fixing plate 160 may press the flange of the first lens part 121 to edges of the first light transmitting aperture 161 and the second light transmitting aperture 162 and may fix the flange of the first lens part 121 to the first support 111. A groove in which the flange of the first lens part 121 is to be settled may be formed along the edges of the first light transmitting aperture 113*a* and the second light transmitting aperture 113*b* of the support bracket 110. Since the flange of the first lens part 121 may be pressed from both sides thereof by the support bracket 110 and the first fixing plate 160, the first lens part 121 may be be fixed to the support bracket 110.

The first fixing plate 160 may be coupled to the first support 111 by using a fastening means BT, such as a screw, a bolt-and-nut, and the like. The first lens part 121 may be coupled to the first support 111 by fitting the first lens part 121 to the light transmitting aperture of the support bracket 110, pressing the flange of the first lens part 121 with the first fixing plate 160, and then coupling the first fixing plate 160 to the first support 111 with the fastening means BT.

Figure 20:
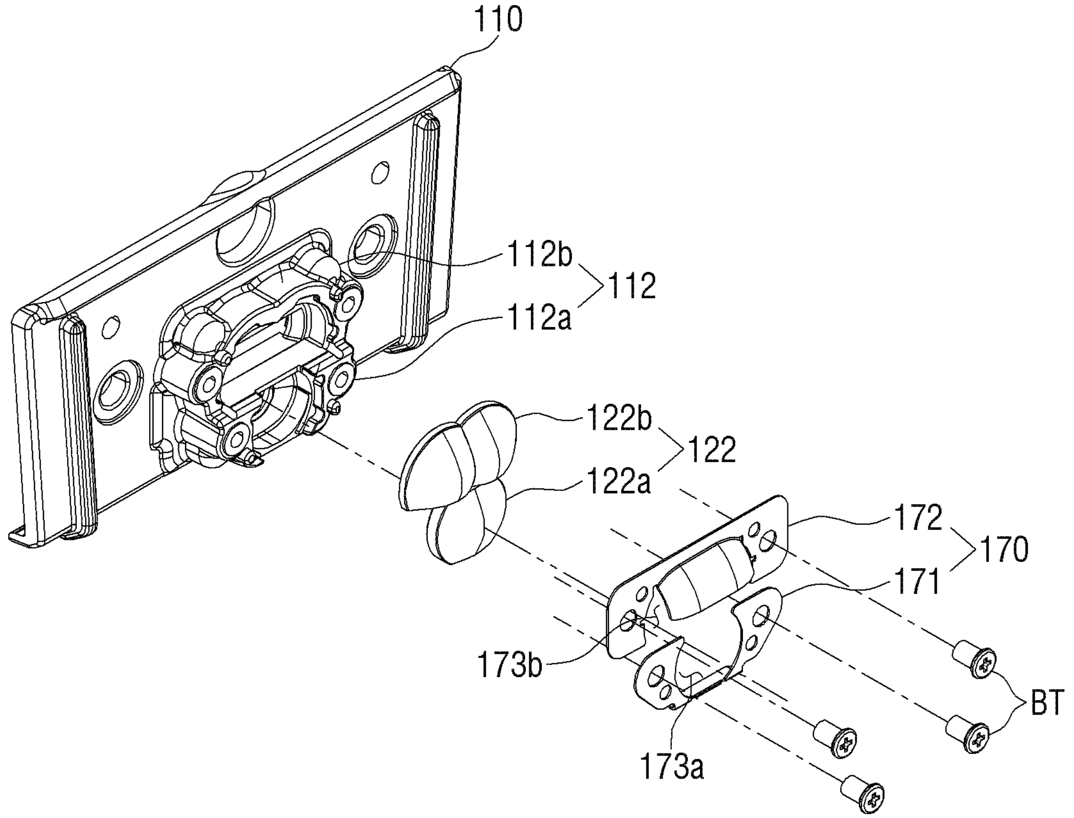
FIG. 20 depicts a coupling relationship between the second lens part and the support bracket.

FIG. 20 depicts a coupling relationship between the second lens part and the support bracket. Referring to FIG. 20, the support bracket 110 may include the second support 112 configured to support the second lens part 122. The second support 112 may be disposed towards the beam pattern forming part 300 and may support the second lens 122*a* of the first optical group 181 and the second lens 122*b* of the second optical group 182. The second support 112 may be formed so that the surface of the support bracket 110 protrudes outwards by a predetermined length. Accordingly, the first lens part 121 and the second lens part 122 may be maintained at a predetermined interval from the support bracket 110 by the second support 112.

The second support 112 may include a first support portion 112*a* and a second support portion 112*b*. The first support portion 112*a* may support the second lens 122*a* of the first optical group 181, and the second support portion 112*b* may support the second lens 122*b* of the second optical group 182. A step (e.g., a difference in protrusion lengths) may be formed between the first support portion 112*a* and the second support portion 112*b* so that the first support portion 112*a* protrudes farther than the second support portion 112*b*. With the protrusion of the first support portion 112*a*, the distance between the surface of the support bracket 110 and an emitting surface of the second lens 122*a* of the first optical group 181 may be set to be greater than the distance between the surface of the support bracket 110 and an emitting surface of the second lens 122*b* of the second optical group 182. Accordingly, an optical path length between the first lens 121*a* and the second lens 122*a* of the first optical group 181 may be formed longer than an optical path length between the first lens 121*b* and the second lens 122*b* of the second optical group 182.

A second fixing plate 170 may be used to fix the second lens part 122 to the second support 112. The second fixing plate 170 may fix the second lens 122*a* of the first optical group 181 and the second lens 122*b* of the second optical group 182 to the second support 112. The second fixing plate 170 may include a first light transmitting aperture 173*a* and a second light transmitting aperture 173*b*. The second fixing plate 170 may transmit light of the first light source 130*a* and the second light source 130*b* through the first light transmitting aperture 173*a* and the second light transmitting aperture 173*b*, respectively. Furthermore, the second fixing plate 170 may provide a shielding function of obstructing the light in the areas other than the light transmitting apertures 173*a* and 173*b*. As the light is transmitted only through the light transmitting apertures 173*a* and 173*b*, and the light may be blocked from being incident into the lenses 122*a* and 122*b* included in the second lens part 122 through the remaining area of the second fixing plate 170, an intended beam pattern may be formed, and the occurrence of glare may be prevented more effectively.

The second fixing plate 170 may press the flange of the second lens part 122 to edges of the first light transmitting aperture 173*a* and the second light transmitting aperture 173*b* and fix the flange of the second lens part 122 to the second support part 112. A groove in which the flange of the second lens part 122 is to be settled may be formed along the edges of the first light transmitting aperture 113*a* and the second light transmitting aperture 113*b* of the support bracket 110. Since the flange of the second lens part 122 may be pressed from both sides thereof by the support bracket 110 and the second fixing plate 170, the second lens part 122 may be fixed to the support bracket 110.

The second fixing plate 170 may include a first fixing part 171 and a second fixing part 172. The first fixing part 171 may fix the second lens 122*a* of the first optical group 181 to the second support 112, and the second fixing part 172 may fix the second lens 122*b* of the second optical group 182 to the second support 112. In some embodiments of the present disclosure, the second lens 122*a* of the first optical group 181 and the second lens 122*b* of the second optical group 182 may be fixed to the second support 112 by an integrated second fixing plate 170.

The second fixing plate 170 may be coupled to the second support 112 using a fastening means BT, such as a screw, a bolt-and-nut, and the like. The second lens part 122 may be coupled to the second support 112 by fitting the second lens part 122 to the light transmitting aperture of the support bracket 110, pressing the flange of the second lens part 122 with the second fixing plate 170, and then coupling the second fixing plate 170 to the second support 112 with the fastening means BT.

Figure 21:
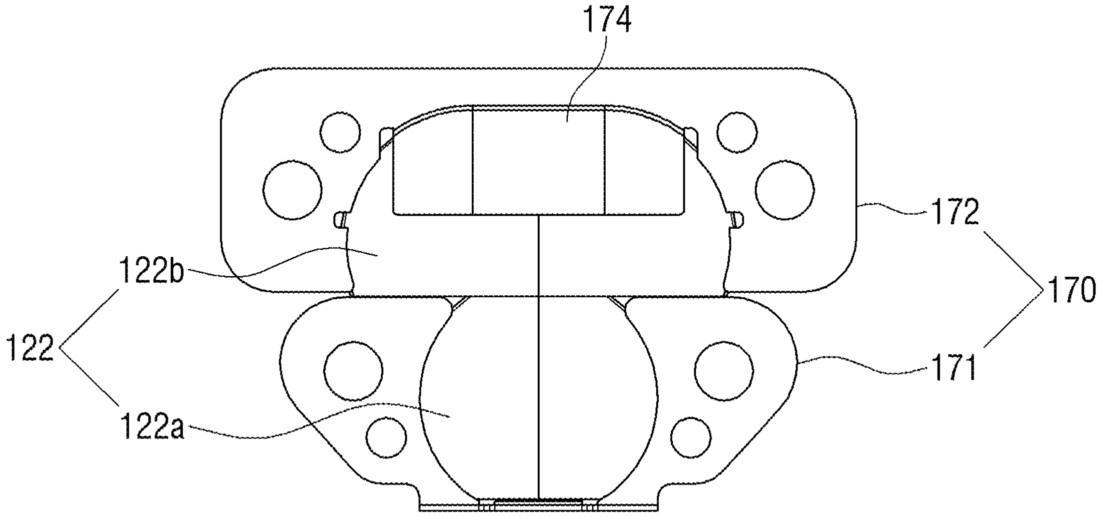
FIG. 21 illustrates a second fixing plate coupled to the second lens part.

FIG. 21 illustrates the second fixing plate coupled to the second lens part. Referring to FIG. 21, the second fixing plate 170 may include a shield 174 configured to obstruct some of the light from entering the second lens 122*b* of the second optical group 182. The shield 174 may be configured to surround an upper area of the second lens 122*b* of the second optical group 182 to prevent the transmission of light through the corresponding area. The shield 174 may obstruct some portion of the light from being emitted from the second lens 122*b* of the second optical group 182 and may prevent the transmission of light to the light transmitting apertures 173*a* and 173*b* of the second fixing plate 170, thereby allowing an intended beam pattern to be formed. If light is transmitted through the upper area of the second lens 122*b* of the second optical group 182, glare may occur by the corresponding light. Since, however, some light is obstructed by the shield 174, the occurrence of glare may be prevented.

Figure 22:
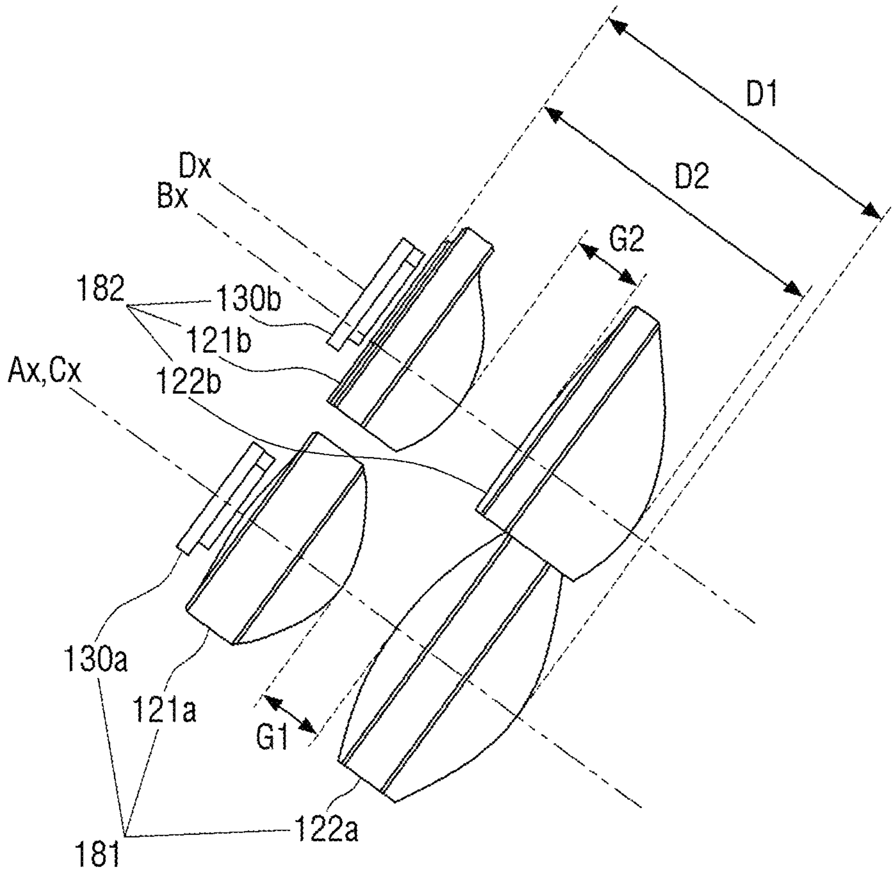
FIG. 22 illustrates an optical group of the first optical part.

FIG. 22 illustrates the optical group. Referring to FIG. 22, the first optical part 100 may include the first optical group 181 and the second optical group 182.

The first optical group 181 may irradiate light for forming the first variable beam pattern VP1. The first optical group 181 may include the first light source 130*a* and the first lens set 121*a* and 122*a*. The first light source 130*a* may irradiate a first light. The first lens set 121*a* and 122*a* may include a plurality of lenses spaced apart from one another and may transmit the first light. Specifically, the first lens set 121*a* and 122*a* may include the first lens 121*a* and the second lens 122*a*, and the first lens 121*a* and the second lens 122*a* may have a coinciding optical axis Ax.

The second optical group 182 may irradiate light for forming the second variable beam pattern VP2. The second optical group 182 may include the second light source 130*b* and the second lens set 121*b* and 122*b*. The second light source 130*b* may irradiate a second light. The second lens set 121*b* and 122*b* may include a plurality of lenses spaced apart from one another and may transmit the second light. Specifically, the second lens set 121*b* and 122*b* may include the first lens 121*b* and the second lens 122*b*, and the first lens 121*b* and the second lens 122*b* may have a coinciding optical axis Bx.

The first light source 130*a* may be disposed so that an optical axis Cx of the first light source 130*a* coincides with the optical axis Ax of the first lens set 121*a* and 122*a*. The optical axis Ax of the first lens 121*a* and the second lens 122*a* of the first optical group 181 may coincide with the optical axis Cx of the first light source 130*a*, and the first light irradiated from the first light source 130*a* may be irradiated in a direction generally parallel to the optical axis Ax of the first lens set 121*a* and 122*a*.

The optical axis Bx of the first lens 121*b* and the second lens 122*b* of the second optical group 182 may be spaced apart from an optical axis Dx of the second light source 130*b*. The second light source 130*b* may be disposed so that the optical axis Dx of the second light source 130*b* is spaced apart from the optical axis Bx of the second lens set 121*b* and 122*b*. Specifically, the second light source 130*b* may be disposed so that the optical axis Dx is disposed above the optical axis Bx of the second lens set 121*b* and 122*b*. Accordingly, the second light irradiated from the second light source 130*b* may be inclined and irradiated downwards with respect to the optical axis Bx of the second lens set 121*b* and 122*b*.

In the present disclosure, the first light source 130*a* and the second light source 130*b* may not be simultaneously turned on. In other words, when the first light source 130*a* is turned on, the second light source 130*b* may be turned off, and when the second light source 130*b* is turned on, the first light source 130*a* may be turned off. In other words, at least one of the first light source 130*a* or the second light source 130*b* may be turned off. Accordingly, the first variable beam pattern VP1 and the second variable beam pattern VP2 may not be formed simultaneously, and only one of the two beam patterns may be formed, or neither may be formed.

An optical path length D1 of the first lens set 121*a* and 122*a* may be formed longer than the optical path length D2 of the second lens set 121*b* and 122*b*. The first reflection region R1 of the reflection part 330 may have a smaller area than the second reflection region R2. As the optical path length D1 of the first lens set 121*a* and 122*a* is formed longer than the optical path length D2 of the second lens set 121*b* and 122*b*, light condensation efficiency of the first lens set 121*a* and 122*a* may be improved.

The optical axis Ax of the first lens set 121*a* and 122*a* and the optical axis Bx of the second lens set 121*b* and 122*b* may be formed in parallel. The first lens set 121*a* and 122*a* and the second lens set 121*b* and 122*b* may be disposed in parallel, which allows the first lens set 121*a* and 122*a* and the second lens set 121*b* and 122*b* to be more easily fixed to the support bracket 110.

The first lens set 121*a* and 122*a* and the second lens set 121*b* and 122*b* may be disposed adjacent to each other. For example, the first lens set 121*a* and 122*a* and the second lens set 121*b* and 122*b* may be disposed such that lateral surfaces thereof face each other. Furthermore, at least one of the first lens set 121*a* and 122*a* or the second lens set 121*b* and 122*b* may be formed so that a portion of the lens set that faces the other lens set is planar. Although FIG. 22 illustrates that a portion of the second lens set 121*b* and 122*b* is formed in a planar shape, in some embodiments, a portion of the first lens set 121*a* and 122*a* may be formed in a plane, or a portion of both the first lens set 121*a* and 122*a* and the second lens set 121*b* and 122*b* may be formed in a plane.

Due to the planar portion of the lens set, the optical axis Ax of the first lens set 121*a* and 122*a* and the optical axis Bx of the second lens set 121*b* and 122*b* may be maintained closer to each other, thereby allowing the light from the first light source 130*a* and the second light source 130*b* to be more easily condensed to the reflection part 330.

The first lens 121*a* and the second lens 122*a* of the first optical group 181 may be spaced apart from each other by a predetermined distance G1. Likewise, the first lens 121*b* and the second lens 122*b* of the second optical group 182 may be spaced apart from each other by a predetermined distance G2. The distances G1 and G2 between the first lenses 121a and 121b and the second lenses 122a and 122b may be determined to more efficiently condense the light from the light sources 130a and 130b to the reflection part 330. Accordingly, the distances G1 and G2 between the first lenses 121a and 121b and the second lenses 122a and 122b may be determined according to a focal position and a focal distance of the first lenses 121a and 121b and the second lenses 122a and 122b.

The second optical group 182 may be disposed above the first optical group 181. As described above, the light reflected in the first reflection region R1 of the reflection part 330 and the light reflected in the second reflection region R2 may cross each other, and the crossed light may be irradiated to the second optical part 200. The light irradiated from the first optical group 181 may be reflected from the first reflection region R1 and then irradiated to the second optical part 200. The light irradiated from the second optical group 182 may be reflected from the second reflection region R2 and then irradiated to the second optical part 200. The light emitted from the second reflection region R2 may be irradiated downwards as compared to the light emitted from the first reflection region R1 and may be used to form a road surface pattern.

The first lens 121a and the second lens 122a of the first optical group 181 may have a convex incident surface and a convex emitting surface. Meanwhile, the first lens 121b of the second optical group 182 may have a planar incident surface and a convex emitting surface, and the second lens 122b of the second optical group 182 may have a convex incident surface and a convex emitting surface. Accordingly, the light of the first light source 130a may be condensed more than the light of the second light source 130b and irradiated to the reflection part 330.

Figure 23:
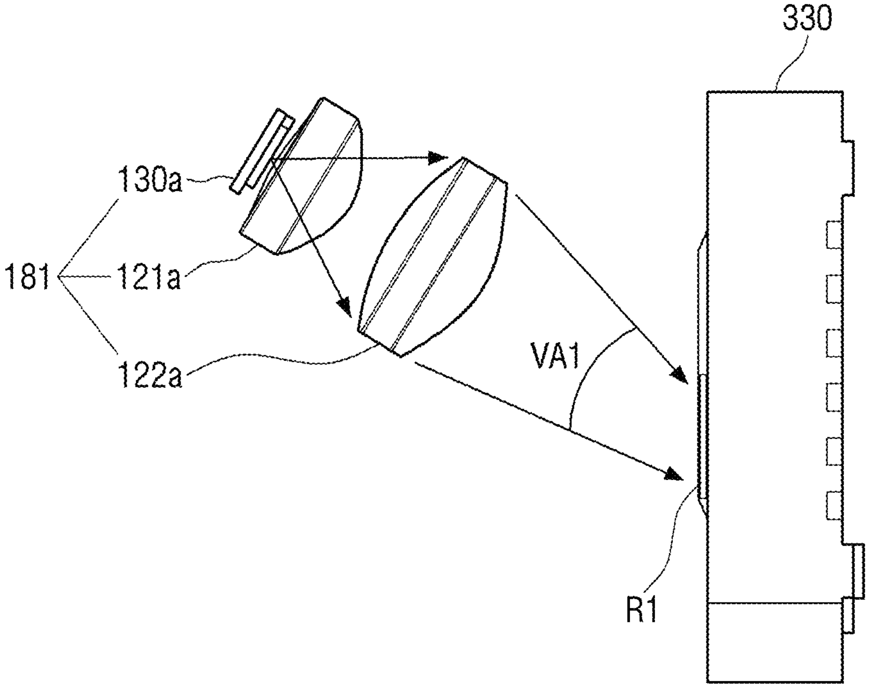
FIG. 23 is a side view illustrating the light of the first optical group being irradiated to the reflection part.
Figure 24:
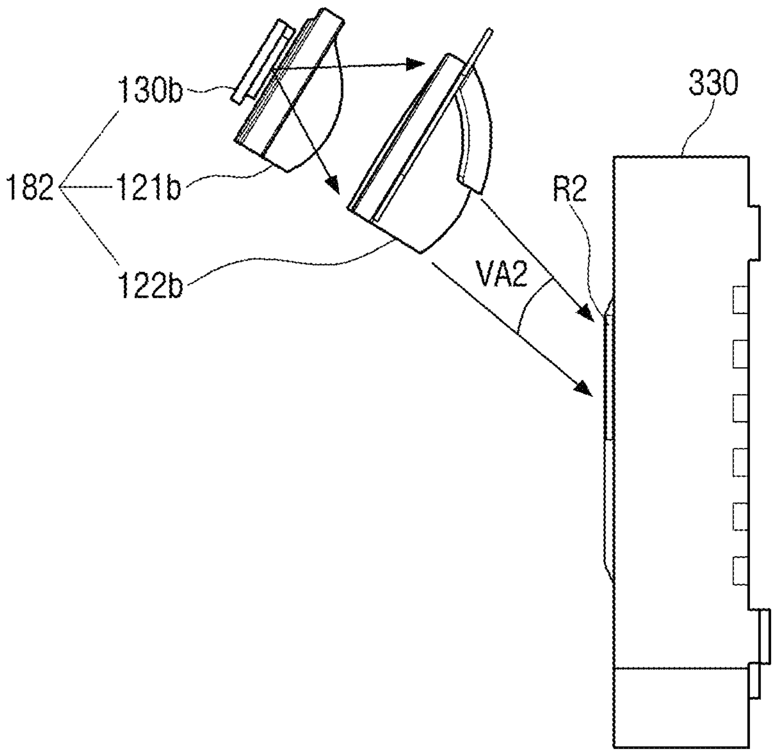
FIG. 24 is a side view illustrating the light of the second optical group being irradiated to the reflection part.

FIG. 23 is a side view illustrating the light of the first optical group being irradiated to the reflection part, and FIG. 24 is a side view illustrating the light of the second optical group being irradiated to the reflection part.

Referring to FIG. 23, the light of the first optical group 181 may be irradiated to the first reflection region R1 of the reflection part 330. The light that is transmitted through the first lens 121a and the second lens 122a of the first optical group 181 may have a predetermined vertical (converging) angle VA1 and be condensed to the reflection part 330. Specifically, the light irradiated from the first light source 130a and passing through the first lens set 121a and 122a may have a predetermined vertical angle VA1 and be condensed to the first reflection region R1.

Referring to FIG. 24, the light of the second optical group 182 may be irradiated to the second reflection region R2 of the reflection part 330. The light that is transmitted through the first lens 121b and the second lens 122b of the second optical group 182 may have a predetermined vertical (converging) angle VA2 and be condensed to the reflection part 330. Specifically, the light irradiated from the second light source 130b and passing through the second lens set 121b and 122b may have a predetermined vertical angle VA2 and be condensed to the second reflection region R2.

The vertical angle VA1 of the light transmitted through the first lens set 121a and 122a and condensed to the reflection part 330 may be formed greater than the vertical angle VA2 of the light transmitted through the second lens set 121b and 122b and condensed to the reflection part 330. Specifically, the vertical angle VA1 of the light transmitted through the first lens 121a and the second lens 122a of the first optical group 181 and condensed to the first region R1 of the reflection part 330 may be greater than the vertical angle V2 of the light transmitted through the first lens 121b and the second lens 122b of the second optical group 182 and condensed to the second region R2 of the reflection part 330. The light of the first light source 130a may be condensed more than the light of the second light source 130b and be irradiated to the reflection part 330. Accordingly, when the first light source 130a and the second light source 130b have substantially equal performance, the first variable beam pattern VP1 may exhibit a higher brightness than the second variable beam pattern VP2.

Figure 25:
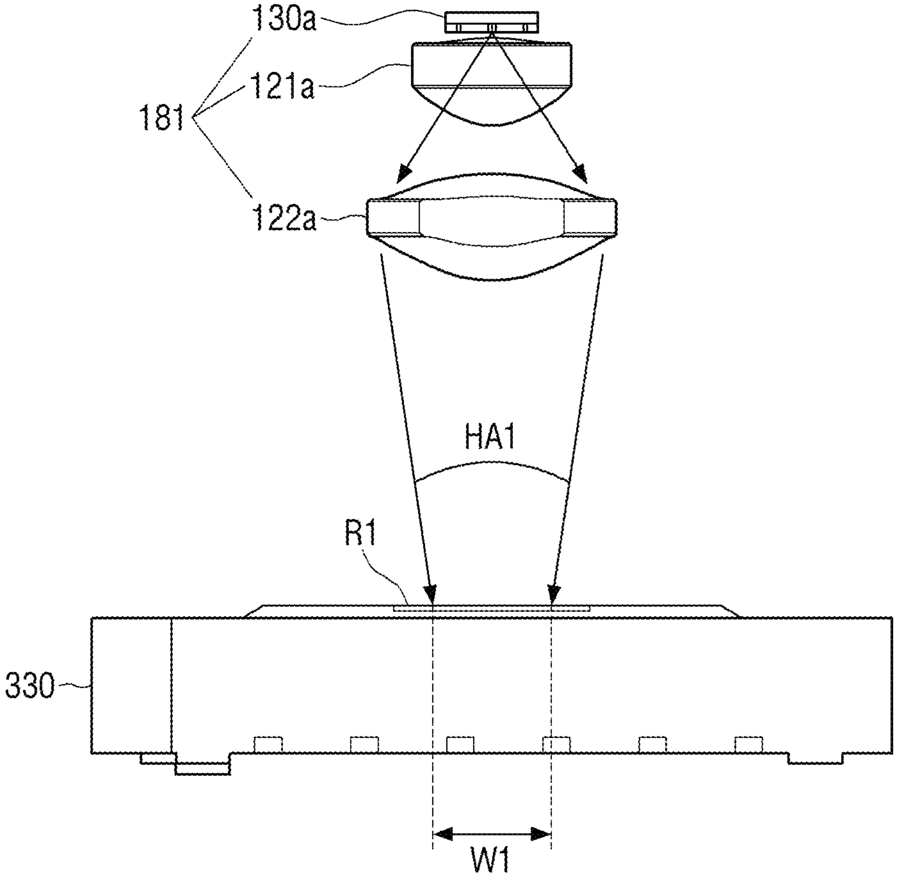
FIG. 25 is a top plan view illustrating the light of the first optical group being irradiated to the reflection part.
Figure 26:
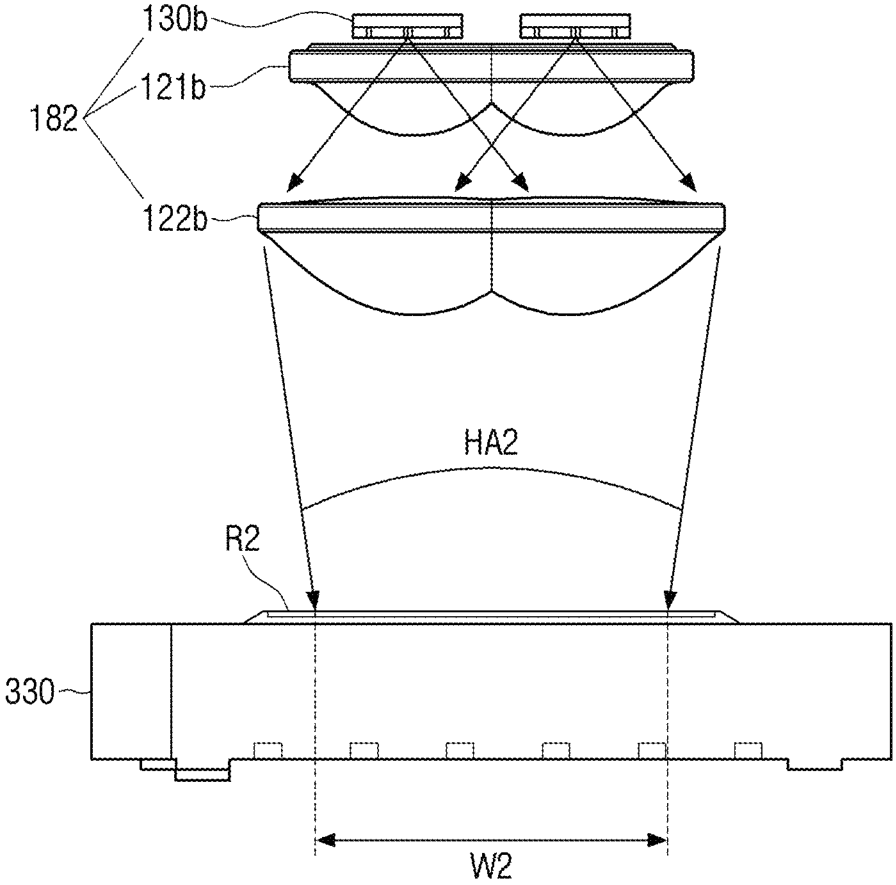
FIG. 26 is a top plan view illustrating the light of the second optical group being irradiated to the reflection part.

FIG. 25 is a top plan view illustrating the light of the first optical group being irradiated to the reflection part, and FIG. 26 is a top plan view illustrating the light of the second optical group being irradiated to the reflection part.

Referring to FIG. 25, the light of the first optical group 181 may be irradiated to the first reflection region R1 of the reflection part 330. The light transmitted through the first lens 121a and the second lens 122a of the first optical group 181 may have a predetermined horizontal (converging) angle HA1 and be condensed to the reflection part 330. Accordingly, the light irradiated from the first light source 130a and transmitted through the first lens set 121a and 122a may have a predetermined horizontal width W1 and be condensed onto the first reflection region R1. The horizontal width W1 of the light mapped to the first reflection region R1 after passing through the first lens set 121a and 122a may be smaller than or equal to the horizontal length of the first reflection region R1.

Referring to FIG. 26, the light of the second optical group 182 may be irradiated to the second reflection region R2 of the reflection part 330. The light transmitted through the first lens 121b and the second lens 122b of the second optical group 182 may have a predetermined horizontal (converging) angle HA2 and be condensed to the reflection part 330. Accordingly, the light irradiated from the second light source 130b and transmitted through the second lens set 121b and 122b may have a predetermined horizontal width W2 and be condensed onto the second reflection region R2. The horizontal width W2 of the light mapped to the second reflection region R2 after passing through the second lens set 121b and 122b may be smaller than or equal to the horizontal length of the second reflection region R2.

The horizontal width of the light transmitted through the second lens set 121b and 122b and condensed to the reflection part 330 may be formed larger than the horizontal width of the light transmitted through the first lens set 121a and 122a and condensed to the reflection part 330. Accordingly, the horizontal length of the second variable beam pattern VP2 may be formed longer than the horizontal length of the first variable beam pattern VP1.

In addition, the horizontal angle HA1 by which the light is condensed onto the reflection part 330 after passing through the first lens 121a and the second lens 122a of the first optical group 181 may be formed larger than the horizontal angle HA2 by which the light is condensed onto the reflection part 330 after passing through the first lens 121b and the second lens 122a of the second optical group 182. Accordingly, the first variable beam pattern VP1 may spread in the horizontal direction wider than the second variable beam pattern VP2.

Figure 27:
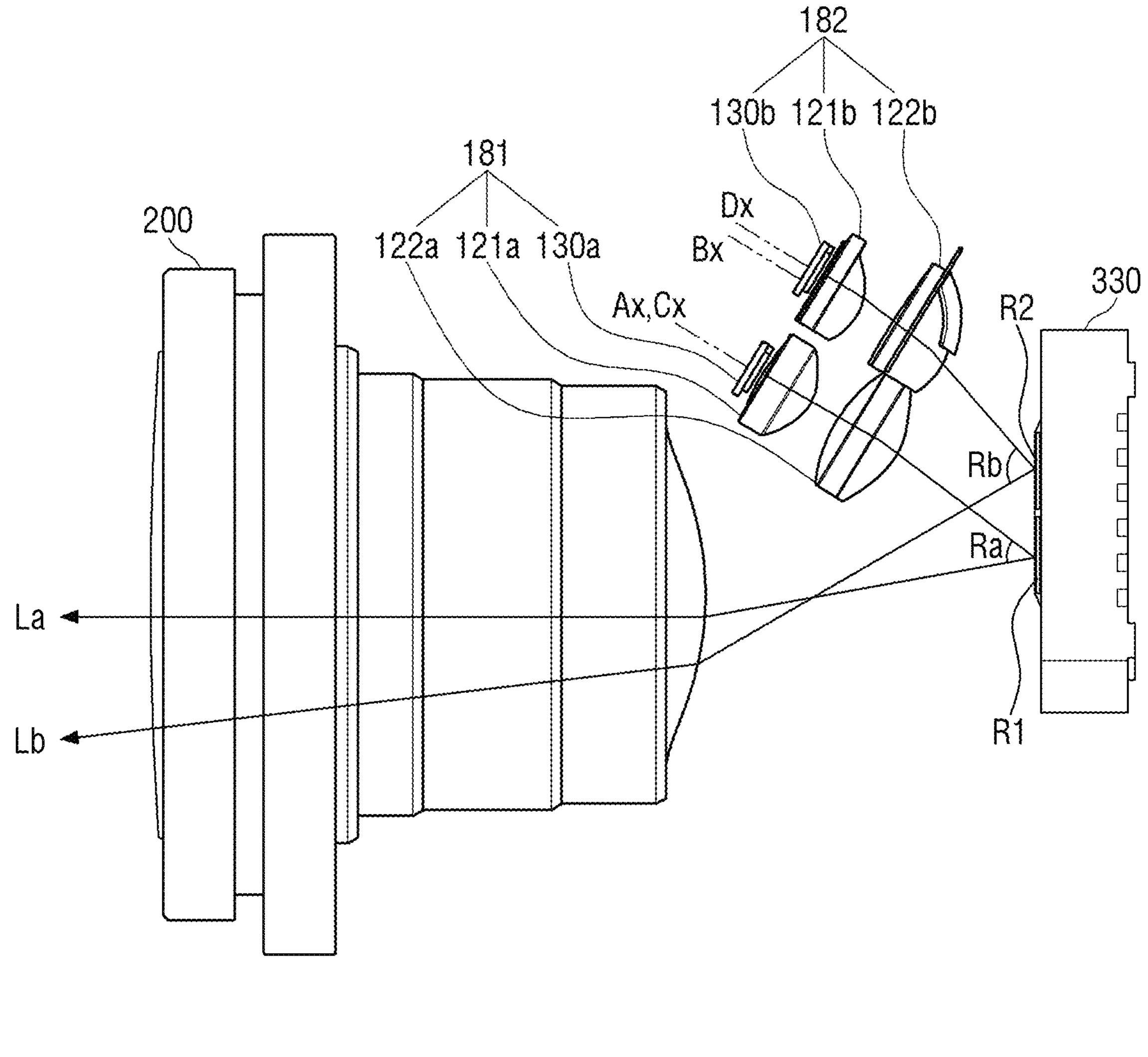
FIG. 27 illustrates the light of the first optical group and the second optical group being reflected by the reflection part to pass through a second optical part.

FIG. 27 illustrates the light of the first optical group and the second optical group being reflected by the reflection part to pass through the second optical part. Referring to FIG. 27, the first optical group 181 and the second optical group 182 may irradiate a first light La and a second light Lb, respectively, to the reflection part 330.

The first optical group 181 and the second optical group 182 may be disposed towards the reflection part 330. Furthermore, the first lens set 121*a* and 122*a* of the first optical group 181 and the second lens set 121*b* and 122*b* of the second optical group 182 may face the reflection part 330 with substantially equal inclination. Specifically, the optical axis Ax of the first lens set 121*a* and 122*a* and the optical axis Bx of the second lens set 121*b* and 122*b* may form a substantially equal angle with respect to a light reflection surface of the reflection part 330. In other words, the optical axis Ax of the first lens set 121*a* and 122*a* may be parallel to the optical axis Bx of the second lens set 121*b* and 122*b*.

As described above, the optical axis Cx of the first light source 130*a* may coincide with the optical axis Ax of the first lens set 121*a* and 122*a*. Accordingly, the first optical group 181 may irradiate the first light La generally parallel to the optical axis Ax of the first lens set 121*a* and 122*a*. Meanwhile, the optical axis Dx of the second light source 130*b* may not coincide with the optical axis Bx of the second lens set 121*b* and 122*b*. Specifically, the optical axis Dx of the second light source 130*b* may be disposed above the optical axis Bx of the second lens set 121*b* and 122*b*.

As the optical axis Dx of the second light source 130*b* does not coincide with the optical axis Bx of the second lens set 121*b* and 122*b*, the angle between the incident light and the reflected light by the second optical group 182 may be formed larger than the angle between the incident light and the reflected light by the first optical group 181. Thus, the angle of the second optical group 182 with respect to an imaginary line that is normal to the light reflecting surface of the reflection part 330 may be formed larger than the angle of the first optical group 181 with respect to the imaginary line that is normal to the light reflecting surface of the reflection part 330. To this end, as shown in FIG. 27, the second optical group 182 may irradiate the second light Lb inclined more downwards as compared to the optical axis Bx of the second lens set 121*b* and 122*b*.

As compared to the second light Lb of the second optical group 182, the first light La of the first optical group 181 may be reflected from a lower region of the reflection part 330, i.e., the first reflection region R1, to pass through the second optical part 200 and then irradiated to the front of the vehicle 1. In such case, the first light La of the first optical group 181 may be incident on the upper region of the second optical part 200 as compared to the second light Lb of the second optical group 182.

The first light La of the first optical group 181 and the second light Lb of the second optical group 182 may cross (e.g., primary optical axes thereof may intersect each other) between the reflection part 330 and the second optical part 200. In other words, the first light La reflected from the first reflection region R1 and the second light Lb reflected from the second reflection region R2 may cross each other and the crossed light may be irradiated to the second optical part 200.

The second light Lb of the second optical group 182 reflected by the reflection part 330 may be irradiated more downwards as compared to the first light La of the first optical group 181 reflected by the reflection part 330. In other words, the second light Lb reflected in the second reflection region R2 may be irradiated to a lower region of the second optical part 200 as compared to the first light La reflected from the first reflection region R1. The first light La reflected from the first reflection region R1 may be irradiated to a longer distance in front of the vehicle 1 as compared to the second light Lb reflected from the second reflection region R2, thereby forming the first variable beam pattern VP1. The second light Lb reflected from the second reflection region R2 may be irradiated to a shorter distance in front of the vehicle 1 as compared to the first light La reflected from the first reflection region R1, thereby forming a second variable beam pattern VP2.

Figure 28:
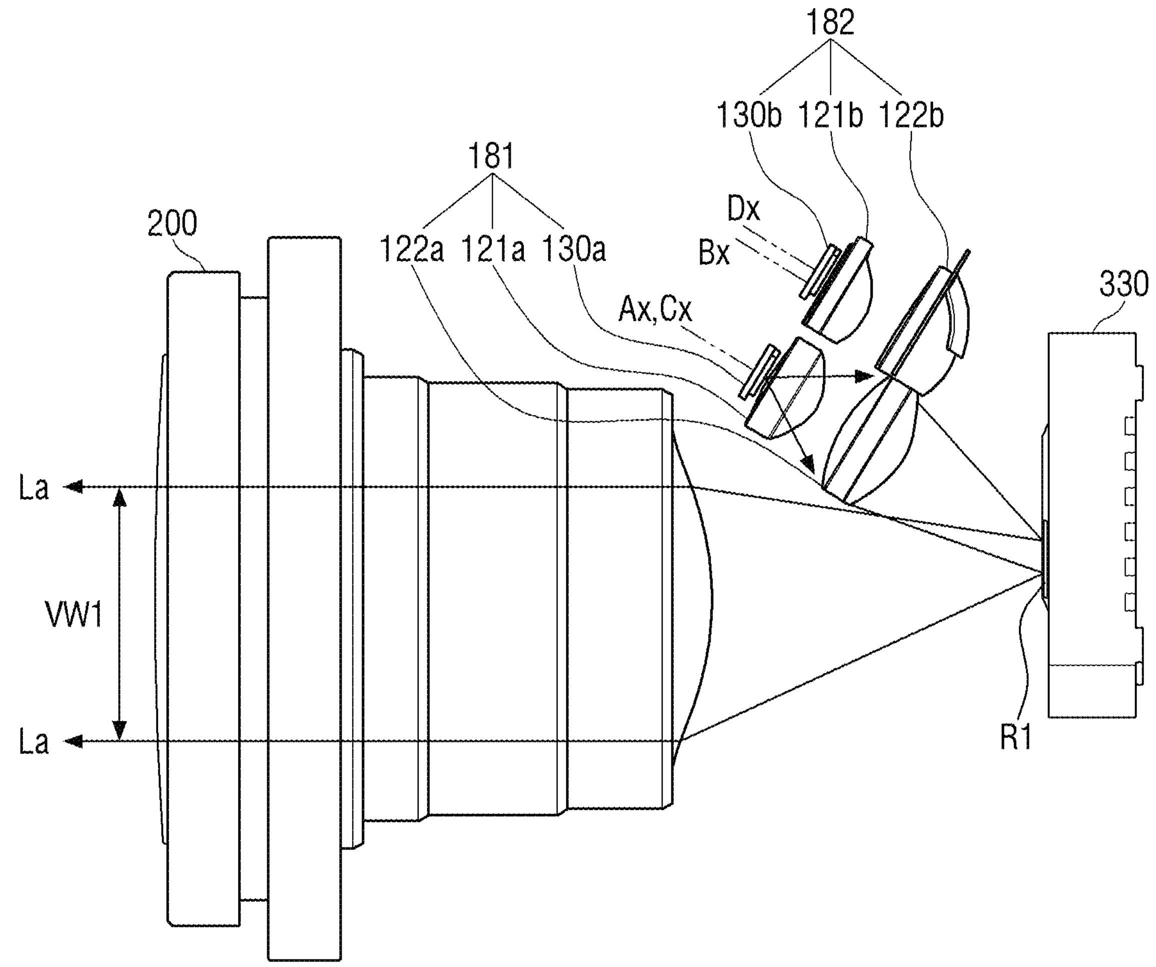
FIG. 28 illustrates the light from the first optical group that passes through the second optical part.
Figure 29:
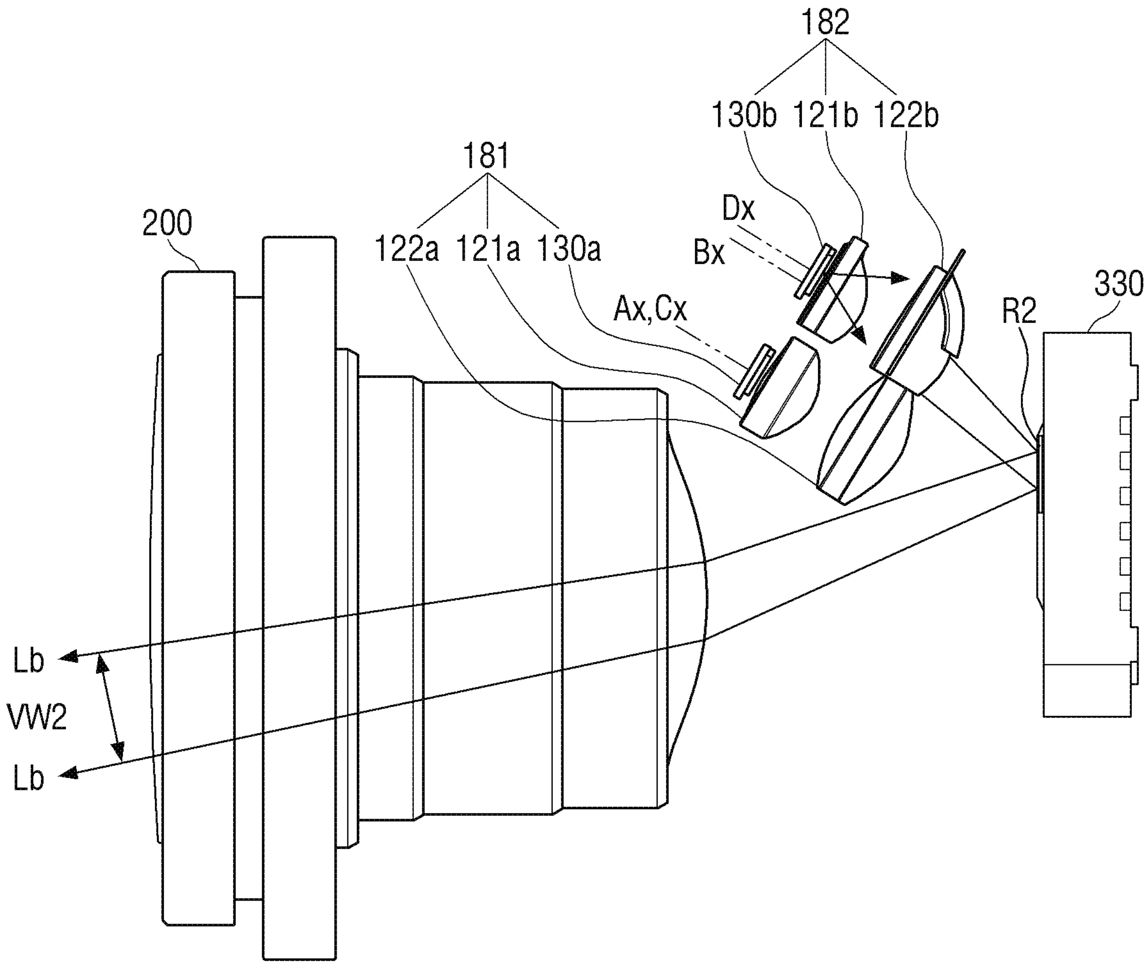
FIG. 29 illustrates the light from the second optical group that passes through the second optical part.

FIG. 28 illustrates the light from the first optical group passing through the second optical part, and FIG. 29 illustrates the light from the second optical group passing through the second optical part.

Referring to FIGS. 28 and 29, the first light La from the first optical group 181 may be generally transmitted through substantially the entire region of the second optical part 200, including the central region, while the second light Lb from the second optical group 182 may be generally transmitted through the lower region of the second optical part 200.

A vertical width VW1 of the first light La of the first optical group 181 passing through the second optical part 200 may be formed larger than a vertical width VW2 of the second light Lb of the second optical group 182 passing through the second optical part 200. Accordingly, the first variable beam pattern VP1 formed by the first light La of the first optical group 181 passing through the second optical part 200 may have a larger vertical width VW1 than the second variable beam pattern VP2 formed by the second light Lb of the second optical group 182 passing through the second optical part 200.

Figure 30:
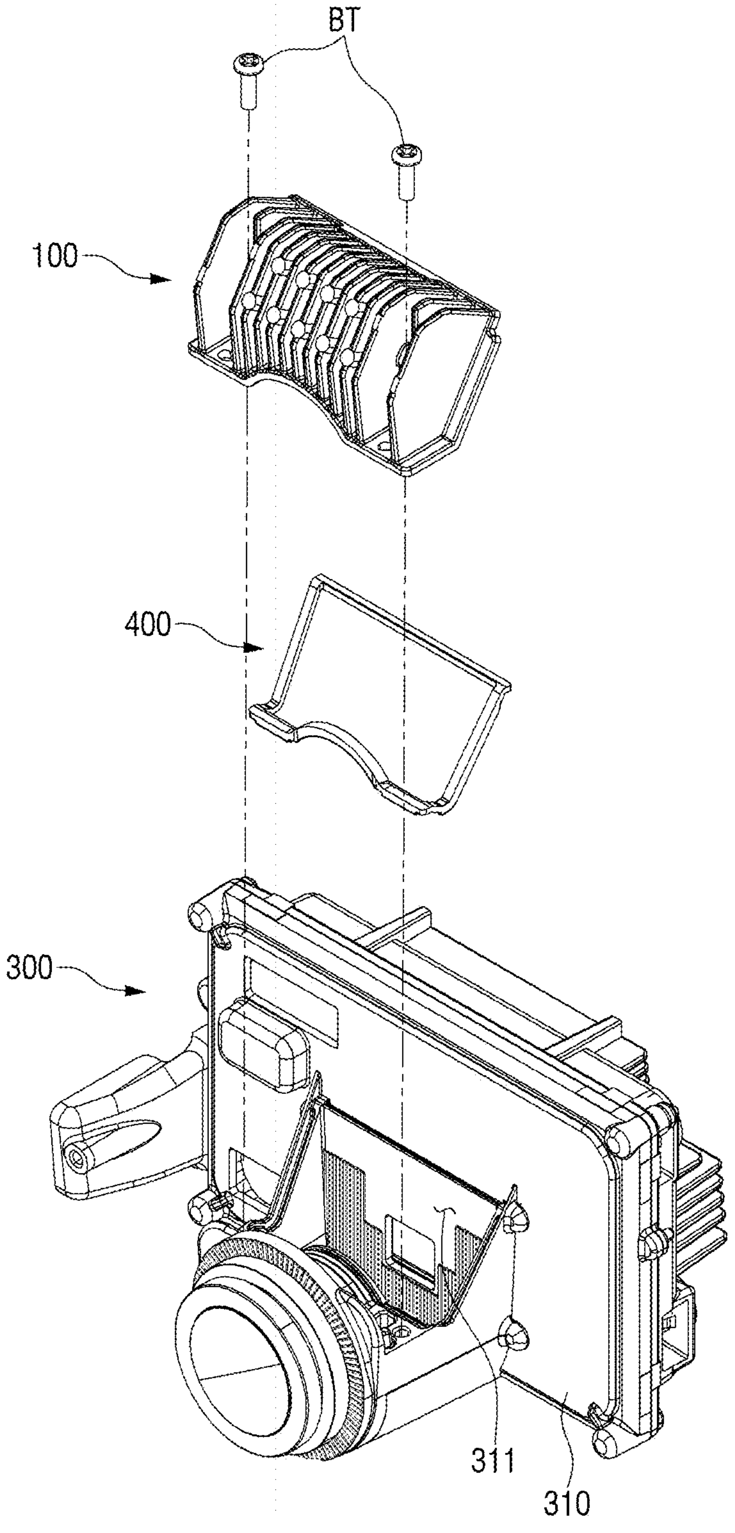
FIG. 30 illustrates the first optical part coupled to the beam pattern forming part.
Figure 31:
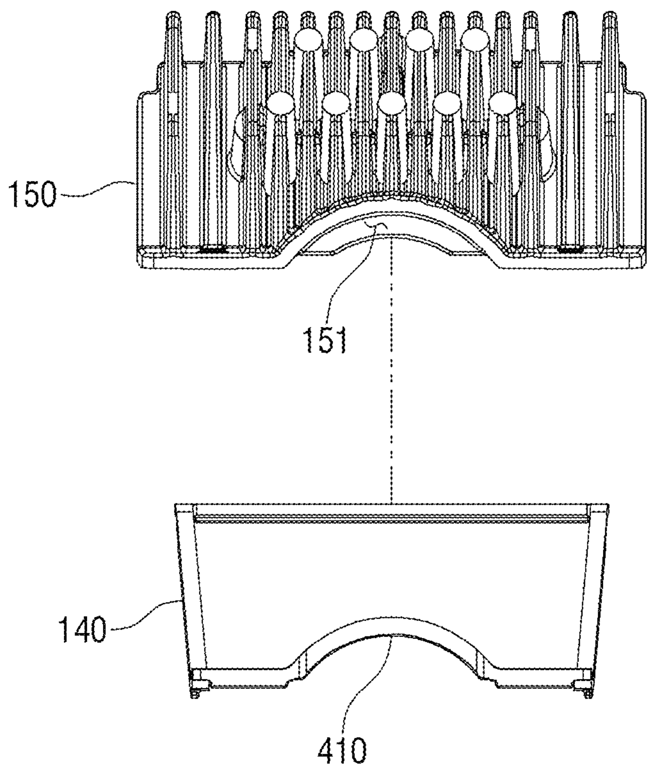
FIG. 31 illustrates an accommodating groove formed in a heat dissipation part of the first optical part.

FIG. 30 illustrates the first optical part coupled to the beam pattern forming part, and FIG. 31 illustrates an accommodating groove formed in the heat dissipation part.

Referring to FIG. 30, the first optical part 100 may be coupled to the beam pattern forming part 300. The first optical part 100 may be coupled to a first housing 310 of the beam pattern forming part 300 by using a fastening means BT. The first housing 310 of the beam pattern forming part 300 may include a light transmitting aperture 311 where the light of the first optical part 100 is incident. If the first optical part 100 and the first housing 310 do not come in sufficiently close contact with each other, a gap may be formed between the first optical part 100 and the first housing 310. When a gap is formed between the first optical part 100 and the first housing 310, foreign substances may be introduced into the beam pattern forming part 300 through the gap.

A sealing part 400 may be provided to prevent the introduction of foreign substances. The sealing part 400 may be disposed between the first optical part 100 and the beam pattern forming part 300 to seal the inside of the beam pattern forming part 300. For instance, the sealing part 400 may include a material of a relatively high resilience, such as rubber, urethane, or silicone. As the sealing part 400 prevents a gap from forming between the first optical part 100 and the first housing 310, foreign materials may be prevented from being introduced into the beam pattern forming part 300.

The second optical part 200 may be disposed adjacent to the light transmitting aperture 311 where the light of the first optical part 100 is incident. The second optical part 200 may be provided in a generally cylindrical shape. Accordingly, a portion of the light transmitting aperture 311 may include an arc corresponding to the shape of the second optical part 200. The sealing part 400 may include an arc-shaped portion 410 that conforms a portion of the second optical part 200, and the position of the arc-shaped portion 410 may correspond to the heat dissipation part 150 of the first optical part 100. Accordingly, as illustrated in FIG. 31, the heat dissipation part 150 may include an accommodating groove 151 configured to accommodate the arc-shaped portion 410 of the sealing part 400. The accommodating groove 151 may accommodate the arc-shaped portion 410 of the sealing portion 400. Since the heat dissipation part 150 is formed according to the shape of the sealing part 400, the effectiveness of sealing of the sealing part 400 may be improved.

Figure 32:
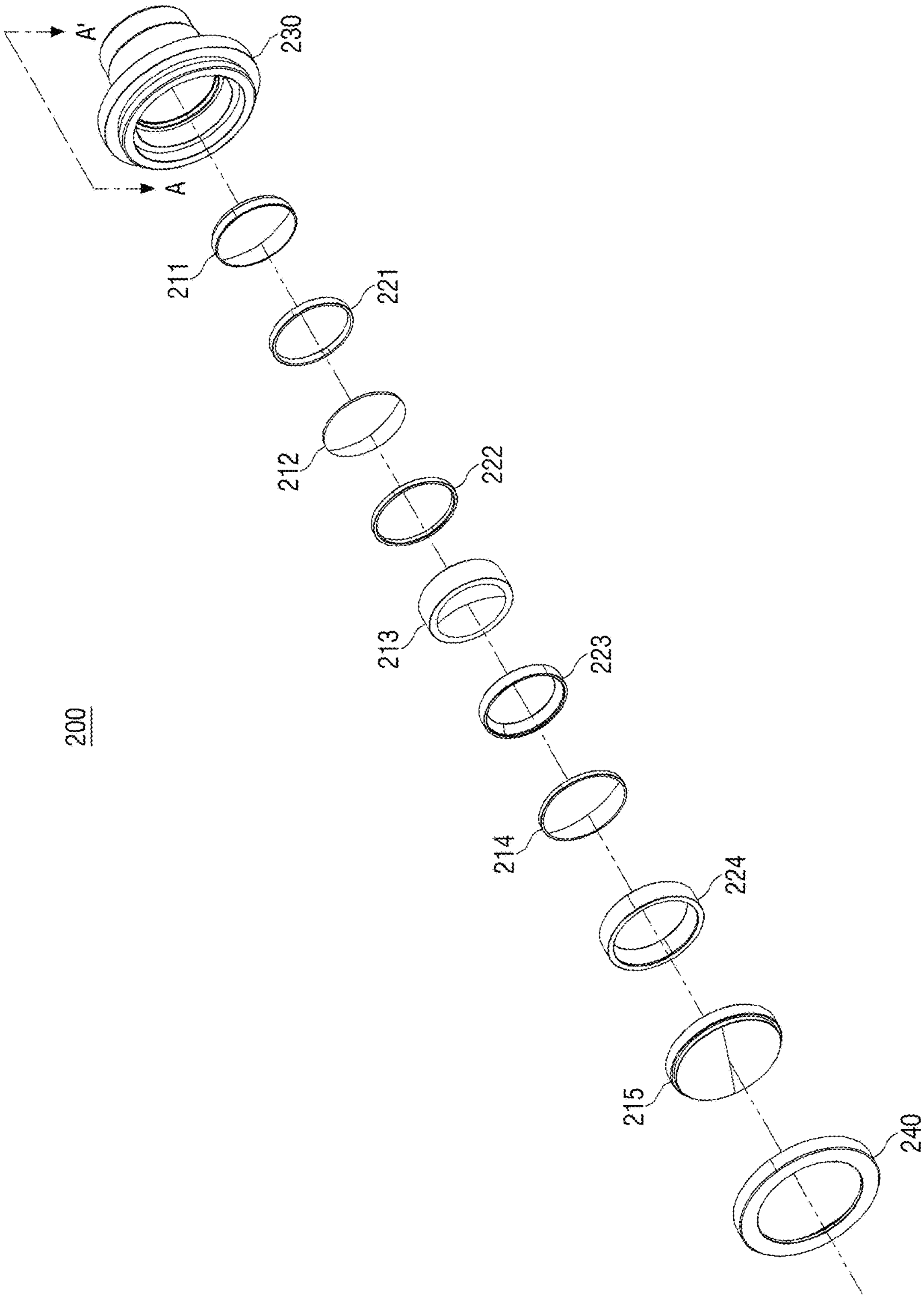
FIG. 32 is an exploded perspective view of the second optical part.
Figure 33:
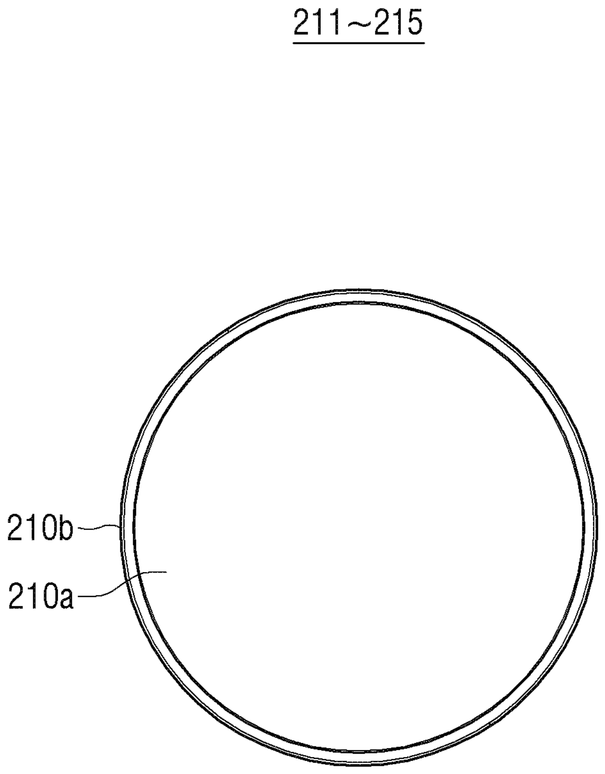
FIG. 33 is a top plan view of lenses of the second optical part.

FIG. 32 is an exploded perspective view of the second optical part, and FIG. 33 is a top plan view of the lens. Referring to FIG. 32, the second optical part 200 may include lenses 211, 212, 213, 214, and 215, spacers 221, 222, 223, and 224, a barrel 230, and a cap 240. A plurality of lenses 211 to 215 may be provided. The plurality of lenses 211 to 215 may transmit the light emitted from the beam pattern forming part 300. The plurality of lenses 211 to 215 may reduce chromatic aberration and emit the light with reduced distortion. To this end, the plurality of lenses may be disposed to maintain a predetermined interval.

Referring to FIG. 33, each of the lenses 211 to 215 may include a light transmitting region 210*a* and a flange 210*b*. The light transmitting region 210*a* may transmit light incident from the beam pattern forming part 300. The light that passes through the light transmitting region 210*a* may be diverged or converged. To this end, the light transmitting region 210*a* may be convex or concave. The flange 210*b* may be formed along an edge of the light transmitting region 210*a*. Specifically, the flange 210*b* may be formed to protrude outwards from the edge of the light transmitting region 210*a*. Meanwhile, according to some embodiments of the present disclosure, at least one of the plurality of lenses 211 to 215 may not include the flange 210*b*, but may include only the light transmitting region 210*a*. Hereinafter, the lenses 211 to 215 including the flange 210*b* will be mainly described.

Referring back to FIG. 32, the spacers 221 to 224 may serve to maintain an interval between adjacent lenses among the plurality of lenses 211 to 215. The spacers 221 to 224 may abut the flange 210*b* formed on an edge of the adjacent lens or may abut a surface of the lenses 211 to 215 to maintain the interval between the adjacent lenses. The spacers 221 to 224 may be provided in the shape of a ring (e.g., an annular shape). For instance, a hollow space may be formed in the part corresponding to the light transmitting region 210*a* of the lenses 211 to 215, thus transmitting the light without deformation.

The barrel 230 may accommodate the plurality of lenses 211 to 215. Furthermore, the barrel 230 may accommodate the spacers 221 to 224 together with the lenses 211 to 215. To this end, the barrel 230 may include an accommodation space for accommodating the lenses 211 to 215 and the spacers 221 to 224. Assemblies of the lenses 211 to 215 and the spacers 221 to 224 may generally have a cylindrical shape, and accordingly, the accommodation space of the barrel 230 may also have a cylindrical shape.

The cap 240 may be coupled to the barrel 230 to prevent the lenses 211 to 215 and the spacers 221 to 224 from deviating from the accommodation space of the barrel 230. Similarly to the spacers 221 to 224, the cap 240 may include a hollow space. The light that passes through the lenses 211 to 215 may be irradiated forward without deformation through the hollow space of the cap 240.

Figure 34:
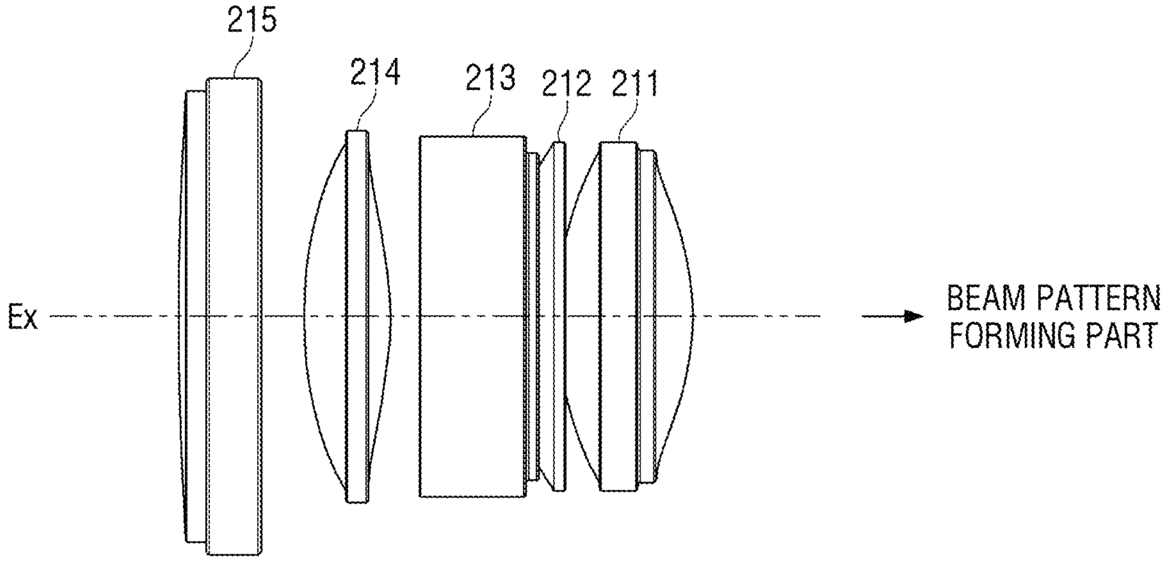
FIG. 34 is a side view of the lenses of the second optical part.

FIG. 34 is a side view of the lens. Referring to FIG. 34, the plurality of lenses 211 to 215 may be disposed so that optical axes Ex thereof coincide with one another. Among the plurality of lenses 211 to 215, a proximal lens 211 that is closest to the beam pattern forming part 300 may have a positive refractive power. Accordingly, the light incident from the beam pattern forming part 300 may be condensed by the proximal lens 211 and delivered to the remaining lenses 212 to 215. Further, the proximal lens 211 closest to the beam pattern forming part 300 may be an aspherical lens. Accordingly, the light incident from the beam pattern forming part 300 may advance in parallel with the optical axis Ex of the plurality of lenses 211 to 215 regardless of the incident direction by the proximal lens 211.

The incident surface of the proximal lens 211 closest to the beam pattern forming part 300 and the emitting surface of a distal lens 215 that is farthest from the beam pattern forming part 300 may be convex. Such configuration may improve the condensation of the light incident on the second optical part 200 and the light emitted therefrom.

The plurality of lenses 211 to 215 may include aspherical lenses and spherical lenses. With an appropriate arrangement of the aspherical and spherical lenses, the chromatic aberration may be reduced and/or straightness of light may be improved. In such case, the number of aspherical lenses among the plurality of lenses 211 to 215 may be greater than the number of spherical lenses. Accordingly, the light emitted from the second optical part 200 may be generally irradiated with straightness.

Incident surfaces and emitting surfaces of at least one lens among the plurality of lenses 211 to 215 may have a different curvature direction. For instance, the incident surface and the emitting surface of the lenses may be convex and concave, respectively, or may be concave and convex, respectively. Alternatively, the incident surface and the emitting surface of at least one lens among the plurality of lenses 211 to 215 may be concave and convex, respectively, or may be convex and concave, respectively. Furthermore, among the plurality of lenses 211 to 215, the number of lenses with the positive refractive power may be greater than the number of lenses with a negative refractive power. The shape of each lens that constitutes the plurality of lenses 211 to 215 and their performance may be appropriately determined to reduce the chromatic aberration and improve the straightness of light.

Although FIGS. 32 and 34 illustrate an example where the second optical part includes five lenses 211 to 215, the number of lenses in the second optical part is not limited thereto. In some embodiments of the present disclosure, the second optical part may include less than or more than five lenses. For instance, the second optical part 200 may include three lenses. In such case, the incident surface of the proximal lens closest to the beam pattern forming part 300 among the plurality of lenses may be concave, while the emitting surface of the distal lens farthest from the beam pattern forming part 300 among the plurality of lenses may be convex, and each of the plurality of lenses may be an aspherical lens. Hereinafter, it will be mainly described that the second optical part 200 includes five lenses 211 to 215.

Figure 35:
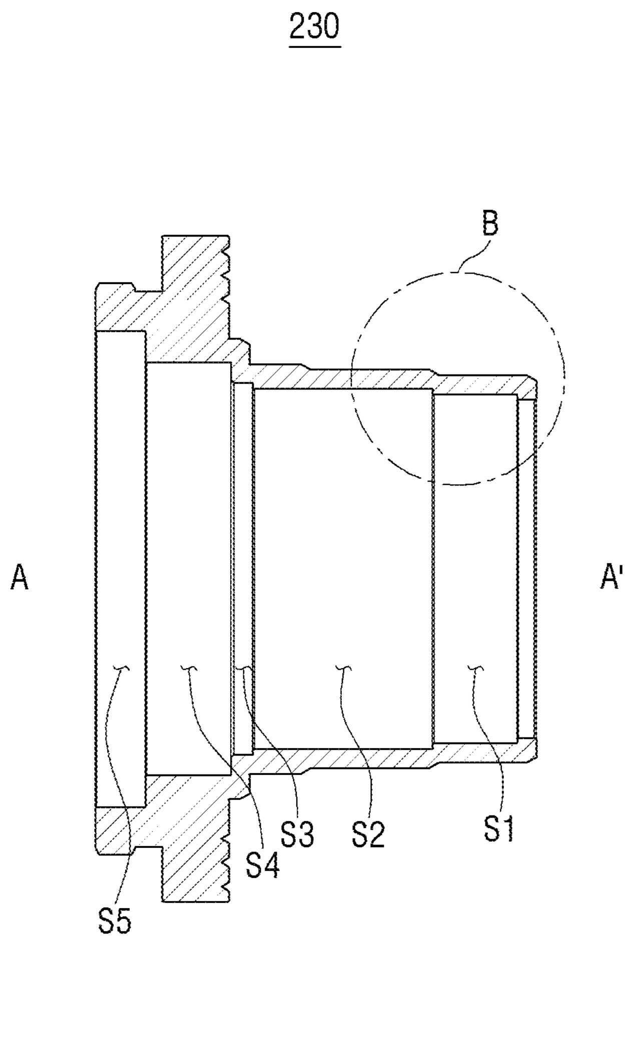
FIG. 35 is a cross-sectional view taken along line A-A' in FIG. 32.
Figure 36:
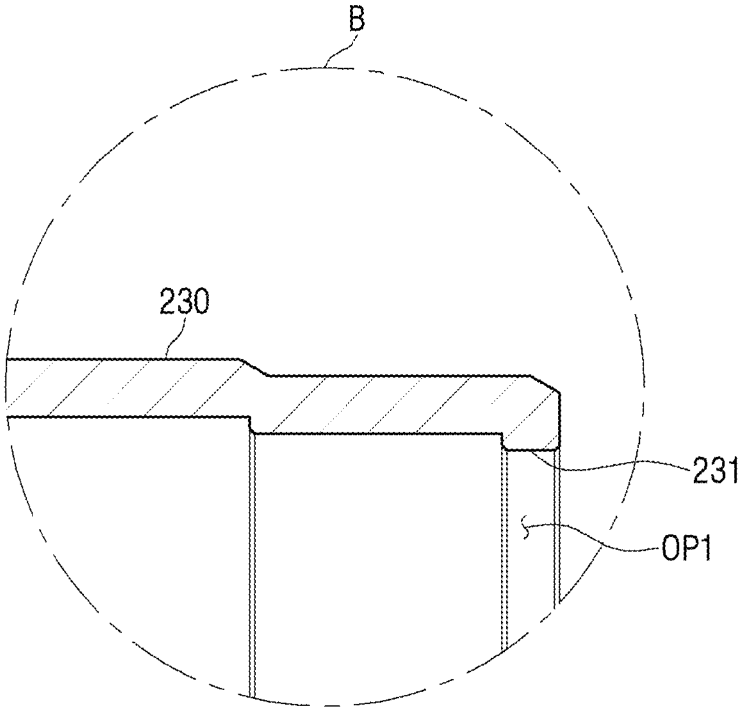
FIG. 36 is an enlarged view of part B in FIG. 35.
Figure 37:
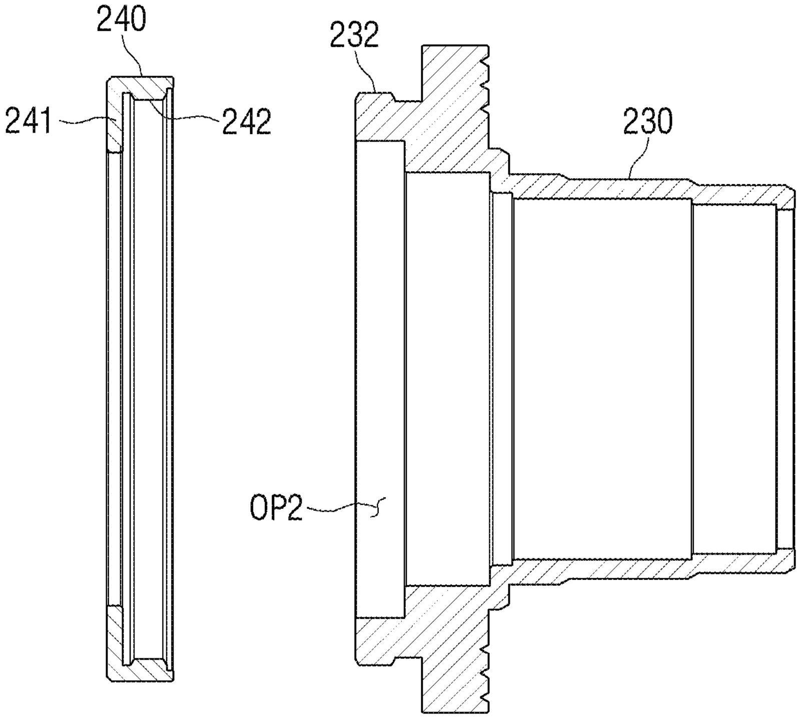
FIG. 37 depicts a coupling relationship between a barrel and a cap of the second optical part.

FIG. 35 is a cross-sectional view taken along line A-A' in FIG. 32, FIG. 36 is an enlarged view of part B in FIG. 35, and FIG. 37 is a view describing a coupling relationship between the barrel and the cap.

Referring to FIG. 35, the barrel 230 may include a plurality of accommodating regions S1, S2, S3, S4 and S5 that correspond to the diameters of each of the plurality of lenses 211 to 215. The plurality of lenses 211 to 215 may have respective diameters. The diameter of the accommodating regions S1 to S5 where each of the lenses 211 to 215 is accommodated may be equal to or similar to a diameter of the corresponding lens. Accordingly, when each of the lenses 211 to 215 is accommodated in the corresponding accommodating regions S1 to S5, it may be prevented from moving in any directions other than the direction of the optical axis.

A step (e.g., diameter change) may be formed between adjacent accommodating regions. The step may prevent the lens with a large diameter from moving to the accommodating region of the lens with a small diameter.

Referring to FIG. 36, the barrel 230 may include a separation prevention feature 231 configured to prevent separation of the proximal lens 211 closest to the beam pattern forming part 300 among the plurality of lenses 211 to 215. The separation prevention feature 231 may be formed so that an inner surface of the barrel 230 protrudes inwards. The separation prevention feature 231 may support the flange 210*b* of the proximal lens 211. With the flange 210*b* supported by the separation prevention feature 231, the proximal lens 211 may be prevented from being separated via an opening OP1 towards the beam pattern forming part 300.

Referring to FIG. 37, the cap 240 may prevent separation of the distal lens 215 farthest from the beam pattern forming part 300 among the plurality of lenses 211 to 215. The cap 240 may include a separation prevention feature 241. The separation prevention feature 241 of the cap 240 may support the flange 210*b* of the distal lens 215. With the flange 210*b* supported by the separation prevention feature 241 of the cap 240, the distal lens 215 may prevented from being separated via an opening OP2 through which light is emitted.

The cap 240 may be coupled to or decoupled from the barrel 230. To this end, the cap 240 and the barrel 230 may include corresponding threads 242 and 232 configured to be coupled to each other, respectively. As the barrel 230 is brought in close contact with the cap 240 and then rotated, the cap 240 and the barrel 230 may become screw-coupled. Furthermore, the cap 240 coupled to the barrel 230 may be rotated to decouple the cap 240 from the barrel 230. Meanwhile, according to some embodiments of the present disclosure, the cap 240 may be coupled to the barrel 230 using an adhesive such as a resin or an ultraviolet adhesive.

Figure 38:
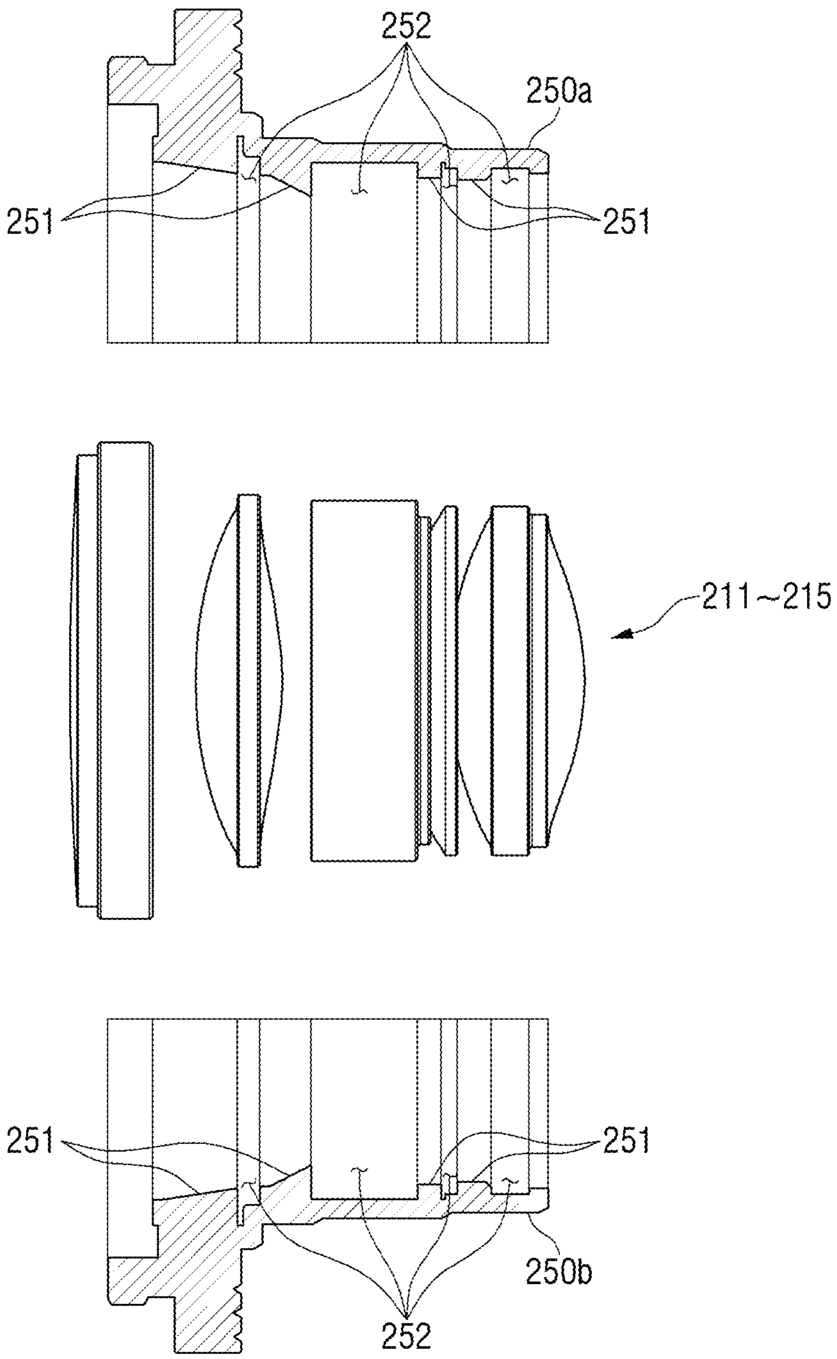
FIG. 38 illustrates the barrel provided with movement prevention features.

FIG. 38 illustrates the barrel provided with a movement prevention feature. Referring to FIG. 38, the barrel 250 may include a movement prevention feature 251. The movement prevention feature 251 may prevent at least some of the plurality of lenses 211 to 215 from moving so that the interval between the plurality of lenses 211 to 215 is maintained. A movement prevention groove 252 may be formed between the adjacent movement prevention features 251. Upon insertion of the flange 210*b* of the lens into the movement prevention groove 252, the lens may be prevented from moving in the direction of the optical axis. The movement prevention feature 251 may be formed to protrude inwards from the inner surface of the barrel 250. For instance, the movement prevention feature 251 may be provided in the form of the aforementioned spacer and fixed to the inner surface of the barrel 250.

The barrel 250 may include a first barrel 250*a* and a second barrel 250*b*. Each of the first barrel 250*a* and the second barrel 250*b* may be provided substantially in the shape of a semicircular pillar. After the first barrel 250*a* and the second barrel 250*b* are brought towards the plurality of lenses 211 to 215, they may be coupled to each other, which makes it possible to accommodate the plurality of lenses 211 to 215 in the barrel 250 with predetermined gaps maintained therebetween. The first barrel 250*a* and the second barrel 250*b* may be coupled using an adhesive such as a resin or an ultraviolet adhesive or be coupled using a coupling means such as a screw. Upon coupling of the first barrel 250*a* and the second barrel 250*b*, the plurality of lenses 211 to 215 may be fixed to the barrel 250. When using the barrel 250 including the movement prevention feature 251, an operation of separately coupling the spacer may be omitted.

Although the embodiments of the present disclosure have been described with reference to the above and the accompanying drawings, those of ordinary skill in the art, to which the present disclosure pertains, may understand that the present disclosure may be implemented in other specific forms without changing the technical spirit or essential features. Therefore, it should be understood that the embodiments described above are illustrative only and non-limiting in any respects.

What is claimed is:

1. A lamp for a vehicle comprising a variable beam forming part that irradiates light and forms variable beam patterns, wherein the variable beam forming part comprises:
- a first optical part that irradiates the light;
- a reflection part including a plurality of micromirrors that reflect the light from the first optical part;
- a second optical part that transmits the light reflected by the reflection part; and
- a housing that supports the first optical part, the second optical part, and the reflection part,
- wherein postures of the plurality of micromirrors are adjusted to a first posture in which the light incident from the first optical part is reflected in a first direction or to a second posture in which the light incident from the first optical part is reflected in a second direction,
- wherein the first optical part comprises:
  - a first optical group that irradiates light for forming a first variable beam pattern; and
  - a second optical group that irradiates light for forming a second variable beam pattern different from the first variable beam pattern,
- wherein the second optical part is disposed on a path of light reflected in the second direction by the plurality of micromirrors and comprises:
  - a plurality of lenses that transmit the light reflected from the reflection part,
- wherein each of the first optical group and the second optical group includes a first lens and a second lens,
- wherein the lamp further comprises a support bracket, which comprises:
  - a first support that supports the first lens of the first optical group and the first lens of the second optical group; and
  - a second support that supports the second lens of the first optical group and the second lens of the second optical group,
- wherein the second support comprises:
  - a first support portion that supports the second lens of the first optical group; and
  - a second support portion that supports the second lens of the second optical group, and
- wherein a step is formed between the first support portion and the second support portion so that the first support portion protrudes farther than the second support portion, thereby allowing an optical path length between the first lens and the second lens of the first optical group to be longer than an optical path length between the first lens and the second lens of the second optical group.

2. The lamp for a vehicle of claim 1, wherein the first optical group comprises:
- a first light source that irradiates a first light; and
- a first lens set including a plurality of lenses spaced apart from one another and configured to transmit the first light, and wherein the second optical group comprises:

a second light source that irradiates a second light; and a second lens set including a plurality of lenses spaced apart from one another and configured to transmit the second light.

3. The lamp for a vehicle of claim 2, wherein the first light source is disposed so that an optical axis of the first light source coincides with an optical axis of the first lens set, and wherein the second light source is disposed so that an optical axis of the second light source is spaced apart from an optical axis of the second lens set.

4. The lamp for a vehicle of claim 1, further comprising:

a first fixing plate that fixes the first lens of the first optical group and the first lens of the second optical group to the first support; and a second fixing plate that fixes the second lens of the first optical group and the second lens of the second optical group to the second support, wherein the second fixing plate includes a shield that obstructs some of the light from being transmitted through the second lens of the second optical group.

5. The lamp for a vehicle of claim 1, wherein, in the second optical part, a number of aspherical lenses among the plurality of lenses is greater than a number of spherical lenses.

6. The lamp for a vehicle of claim 1, wherein, in the second optical part, a number of lenses with a positive refractive power among the plurality of lenses is greater than a number of lenses with a negative refractive power.

* * * * *